United States Patent [19]
Horn et al.

[11] Patent Number: 5,220,398
[45] Date of Patent: Jun. 15, 1993

[54] ANALOG VLSI MICROCHIP FOR OBJECT POSITION AND ORIENTATION

[75] Inventors: Berthold K. P. Horn, Carlisle; David L. Standley, Cambridge, both of Mass.

[73] Assignee: Massachusetts Institute of Technology, Cambridge, Mass.

[21] Appl. No.: 591,145

[22] Filed: Sep. 28, 1990

[51] Int. Cl.[5] ............... G01B 11/26; G01C 1/00; H01J 40/14; H01L 27/14

[52] U.S. Cl. ............... 356/152; 250/206.2; 250/208.2; 250/208.3; 250/208.6; 250/332; 250/214.1; 356/141; 257/431; 257/443

[58] Field of Search ......... 250/206.2, 208.2, 208.3, 250/208.6, 211 J, 332; 357/30, 32; 356/141, 152

[56] References Cited

U.S. PATENT DOCUMENTS

| | | | |
|---|---|---|---|
| 3,657,548 | 4/1972 | Parkin | 250/203 R |
| 3,859,521 | 1/1975 | Connors et al. | 250/211 J |
| 3,925,658 | 12/1975 | Connors | 250/211 J |

OTHER PUBLICATIONS

*Robot Vision*, by B. K. P. Horn (MIT Press, 1986).
"Parallel Networks for Machine Vision" by B. K. P. Horn, (MIT A.I. Memo No. 1071, Dec. 1988).
"The First Year of the MIT Vision Chip Project" by B. K. P. Horn et al., (MIT VLSI Memo No. 89-555, Sep. 1989), pp. 68–69, 94–96 and 157.
*Artificial Intelligence at MIT: Expanding Frontiers*, edited by P. H. Winston and S. A. Shellard (MIT Press, Jun. 1990).
"Local Computation of Useful Global Quantities Using Linear Resitive Grid Networks" by J. Wyatt, D. Standley and B. Horn, Conference on Neural Networks for Computing in Snowbird, Utah, Apr., 1990.
"A Two-Dimensional Visual Tracking Array", by S. P. DeWeerth and C. A. Mead, Proceedings of the 1988 MIT Conference on Very Larg Scale Ingetration, MIT Press, Cambridge, Mass., pp. 259–275, 1988.
"A Spatial Mean and Median Filter in Analog VLSI" by S. A. Kontogiorgis et al., Proceedings of the 23rd Annual Conference on Information Sciences and Systems, John Hopkins University, Mar., 1989, pp. 447–452.
"Semiconductor Gamma Camera" by K. F. Hatch, (Ph.D. thesis, MIT, Cambridge, Mass., Feb., 1972).
"Theory and Fabrication of Ultra-Pure Germanium Detectors for Gamma Camera Applications" by B. A. Khan, (S.M. Thesis, MIT, Cambridge, Mass, May, 1977).
"Position Sensitive Light Detectors with High Linearity" by G. P. Petersson et al., IEEE Journal of Solid-State Circuits, vol. SC-13, No. 3, Jun., 1978, pp. 392–399.
"Two-Dimensional position-sensitive photodetector with high linearity made with standard i.c.-technology" by D. J. W. Noorlag et al, Institution of Elec- (List continued on next page.)

*Primary Examiner*—Stephen C. Buczinski
*Attorney, Agent, or Firm*—Choate, Hall & Stewart

[57] ABSTRACT

An analog VLSI microchip which uses moments to determine the position and orientation of an object in a scene is disclosed. The imaging sensors are implemented on the chip itself using standard fabrication processes. The method allows very high speed computation in a small, low cost, and low power device. The first moments determine the centroid of the image, which provides the position. The second moments, together with the first moments, determine the axis of least inertia, which provides the orientation. The method uses a resistive grid with nodes containing intensity data (in the form of voltages) corresponding to the image. The moment extraction method is a two-stage dimensional reduction of data. First, the two-dimensional array of intensity data is reduced to a one-dimensional array of data (in the form of currents) by the resistive grid. Second, the one-dimensional data array, which is available at the periphery of the grid, is reduced to a data vector, the size of which is independent of the grid size.

22 Claims, 8 Drawing Sheets

OTHER PUBLICATIONS trical Engineers: Journal of Solid-State Electron Devices, 3, May, 1979, pp. 75-82.

"Quantitative Analysis of Effects Causing Nonlinear Position Response in Position-Sensitive Photodetectos" by D. J. W. Noorlag, IEEE Transactions on Electron Devices, vol. ED-29, No. 1, Jan. 1982, pp. 158-161.

"An Integrated Optical Motion Sensor" by J. E. Tanner et al., VLSI Signal Processing II: Proceedings of the ASSP Conference on VLSI Signal Processing, Nov. 5-7, 1986, UCLA, pp. 59-76.

"A Real-time Two-Dimensional Moment Generating Algorithm and Its Single Chip Implementation" by M. Hatamian, IEEE Transactions on Acoustics, Speech, and Signal Processing, vol. 34, No. 3, pp. 546-553, Jun. 1986.

"A Real-time Video Tracking System" by A. L. Gilbert et al., IEEE Transactions on Pattern Analysis and Machine Intelligence, vol. 2, No. 1, Jan. 1980, pp. 47-56.

"Video Data Conversion and Real-Time Tracking" by A. L. Gilbert, IEEE Computer, pp. 50-56, Aug., 1981.

ANALOG VLSI MICROCHIP FOR OBJECT POSITION AND ORIENTATION

BACKGROUND OF THE INVENTION

Analog VLSI microchips for early vision are the focus of an active research area. These chips, which have self-contained photoreceptor arrays, process large amounts of data in parallel to extract certain features of the images. This data compression greatly reduces the information bandwidth of the output because only important aspects of the image, rather than the entire image, are needed for many early vision tasks. Analog implementation schemes are promising because of the nature of such tasks—very large numbers of arithmetic operations are required, which is a bottleneck for digital schemes, yet they are tolerant to errors in analog computation.

The present invention addresses the need for analog VLSI microchips that determine the position and orientation of an object. Presently, most commercially available machine vision systems have only rudimentary mechanisms for dealing with grey-level images and are aimed mainly at binary images. These systems typically have digital means for computing the moments required to determine position and orientation. While such systems are restricted in their application, they are widely available and well understood. They can be used, for example, to determine the position and orientation of an isolated, contrasting workpiece lying flat on a conveyor belt (see, for example, Chapter 3 in *Robot Vision* by B. K. P. Horn, MIT Press, 1986). Once the position and orientation of the object are known, a robot hand with the appropriate orientation may be sent to the indicated position to pick up the part. A device that finds the centroid of a spot of light in the image can also be used as a high-resolution light-pen and a means of tracking a light source, such as a light bulb attached to an industrial robot arm.

A variety of methods is available for efficiently computing the zeroth- and first-order moments, which can be used to indicate the position of an object. Less appears to be known about how to easily compute second- and higher-order moments, which can be used to indicate the orientation of an object. This subject is discussed further in "Parallel Networks for Machine Vision" by B. K. P. Horn (Massachusetts Institute of Technology Artificial Intelligence Laboratory Memo 1071, December 1988). The present invention discloses a fast and elegant method for computing position and orientation of an object by moment extraction using analog networks of relatively few components.

SUMMARY OF THE INVENTION

The vision microchip of the present invention includes is a two-dimensional array of cells that contain photoreceptors. Each cell corresponds to a pixel of the image (which is focused on the chip). The light intensity is converted to a current that is analogous to the weighting of the object (via an intensity conditioning function). The currents from all of the cells are fed into a global two-dimensional resistive grid, and the resulting currents exiting around the grid perimeter are buffered and further reduced to a few currents taken off the chip and measured. The zeroth, first, and second mass moments can be recovered to find the position and orientation. The first moments determine the centroid of the image, which provides the position. The second moments, together with the first moments, determine the axis of least inertia, which provides the orientation. A prototype of the chip has computed orientation with a typical accuracy of $\pm 2°$ or better for moderate or large objects that are sufficiently elongated.

The moment extraction can be thought of as a two-stage dimensional reduction of data. First, the two-dimensional array of intensity data is reduced to a one-dimensional array of data (in the form of currents) by the resistive grid. Second, this one-dimensional data array, which is available at the periphery of the grid, is reduced to an essentially zero-dimensional set of scalar quantities, or data vector. The term zero-dimensional here means that the size of the data vector is a constant, regardless of the grid size. The method allows very high speed computation in a small, low cost, and low power device.

DESCRIPTION OF THE PREFERRED EMBODIMENT

1. Definitions

Position and orientation will be defined as in *Robot Vision* by B. K. P. Horn (MIT Press, 1986). Here the notation has been changed somewhat.

Figure 1:
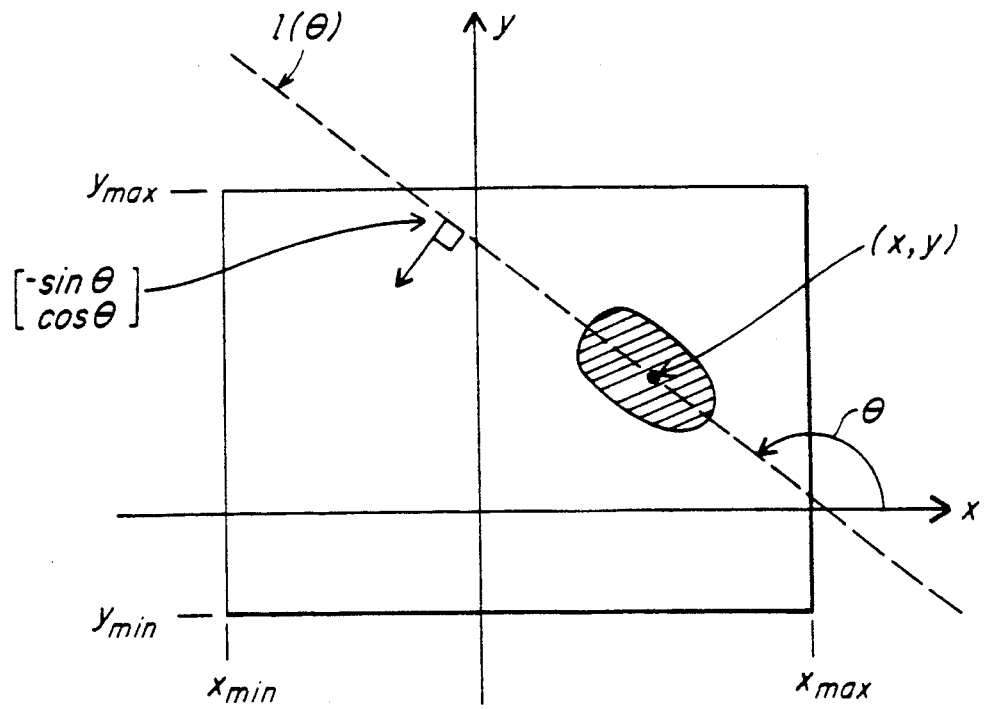
FIG. 1 is a graphical representation of the notation used to define position and orientation of a mass distribution.

FIG. 1 shows an example of an image 10 of an object represented by a mass density distribution $m(x,y)$ at each point $(x,y)$ in the plane. There is a rectangular boundary 11 defined by $x_{min} \leq x \leq x_{max}$ and $y_{min} \leq y \leq y_{max}$. The mass must be nonnegative, i.e. $m(x,y) \geq 0$, for all $(x,y)$ in the bounded region. The subset of this region occupied by the object has $m(x,y) > 0$, and all points outside of this subset (or object) have $m(x,y) = 0$.

The total mass $M_0$ is $$M_0 = \int_{x_{min}}^{x_{max}} \int_{y_{min}}^{y_{max}} m(x,y)dx\, dy$$

The center of mass, or centroid, is the point $(\bar{x},\bar{y})$ given by $$\bar{x} = M_0^{-1} \int_{x_{min}}^{x_{max}} \int_{y_{min}}^{y_{max}} (x)m(x,y)dx\, dy$$

and $$\bar{y} = M_0^{-1} \int_{x_{min}}^{x_{max}} \int_{y_{min}}^{y_{max}} (y)m(x,y)dx\, dy.$$

The centroid is a natural way to define the position of the object. It has the property of tracking along with an arbitrary translation of the object so that it always remains at the same point relative to the object (provided the object remains completely within the boundary). This is also true for a rotation of the object.

Let $l(\theta)$ be the line through $(\bar{x},\bar{y})$ that is at an angle $\theta$ with the x-axis as shown in FIG. 1. Also let $\rho(x,y,\theta)$ be the minimum or perpendicular distance between $l(\theta)$ and the point $(x,y)$. Then for a given $\theta$, the moment of inertia of the object about the line $l(\theta)$ is $I(\theta)$ and defined by $$I(\theta) \stackrel{\Delta}{=} \int_{x_{min}}^{x_{max}} \int_{y_{min}}^{y_{max}} \rho^2(x,y,\theta)m(x,y)dx\, dy$$

The function $I(\theta)$ has two important properties. First, $I(\theta)$ is periodic with period $T_\theta = \pi$ radians, or 180°. Second, $I(\theta)$ is either a constant or it has a unique maximum and minimum over the interval $\theta \in [\theta_0, \theta_0 + T_\theta)$ for any $\theta_0$. In the latter case, the location of the maximum (or of the minimum) is a natural definition for the orientation of the object; it has the property of tracking along with an arbitrary rotation of the object, provided the object remains completely within the image boundary. But in the former case, when $I(\theta)$ is a constant, it can't be used to define orientation. This can happen if the object is rotationally symmetric about its centroid, such as a circle of uniform density, for which orientation is impossible to define by any means. It can also happen for other symmetrical objects such as a square, for which orientation can be defined somehow (if in an ad hoc sense). But the special case of a constant $I(\theta)$ will not be pursued for two reasons. First, it is a relatively small class of objects. Second, it would be difficult, if not impossible, to find a simple and unified definition of orientation for such a variety of objects, which include "n-fold rotationally symmetric objects" along with highly irregular objects; such definitions could not, in general, have the uniqueness property for $\theta$ over a 180° interval. Thus, orientation will be defined by the unique angle $\theta_{li} \in [0°, 180°)$ that minimizes $I(\theta_{li})$, where $I(\theta)$ is the inertia function associated with $m(x,y)$, provided this minimum is unique. The line $l(\theta_{li})$ is known as the axis of least inertia. (The orientation could have been defined as the axis of greatest inertia, corresponding to the maximum of $I(\theta)$, which is perpendicular to $l(\theta_{li})$.)

A distribution $m(x,y)$ has first moments $M_x$ and $M_y$ defined by $$M_x \stackrel{\Delta}{=} \int_{x_{min}}^{x_{max}} \int_{y_{min}}^{y_{max}} (x)m(x,y)dx\, dy$$

and $$M_y \stackrel{\Delta}{=} \int_{x_{min}}^{x_{max}} \int_{y_{min}}^{y_{max}} (y)m(x,y)dx\, dy.$$

and second moments $M_{x2}$, $M_{y2}$, and $M_{xy}$ defined by $$M_{x2} \stackrel{\Delta}{=} \int_{x_{min}}^{x_{max}} \int_{y_{min}}^{y_{max}} x^2 m(x,y)dx\, dy,$$

$$M_{y2} \stackrel{\Delta}{=} \int_{x_{min}}^{x_{max}} \int_{y_{min}}^{y_{max}} y^2 m(x,y)dx\, dy,$$

and $$M_{xy} \stackrel{\Delta}{=} \int_{x_{min}}^{x_{max}} \int_{y_{min}}^{y_{max}} (xy)m(x,y)dx\, dy.$$

The total mass $M_0$ is also known as the zeroth moment.

The position can be expressed in terms of the zeroth and first moments by $$\bar{x} = M_x/M_0 \text{ and } \bar{y} = M_y/M_0.$$

The orientation $\theta_{li}$ can be expressed in terms of the first and second moments, as demonstrated in Horn, 1986, as $$\theta_{li} = \tfrac{1}{2}\arctan(a' - c', 2b'),$$

where, $$a' \stackrel{\Delta}{=} M_{x2} - M_0(\bar{x})^2,$$

$$b' \stackrel{\Delta}{=} M_{xy} - M_0(\bar{x}\bar{y}),$$

$$c' \stackrel{\Delta}{=} M_{y2} - M_0(\bar{y})^2.$$

and where for any $(u,v) \neq (0,0)$, $\arctan(u,v)$ is defined to be the unique angle $\phi \in [0°, 360°)$ such that $u = \sqrt{u^2+v^2} \cos \phi$ and $v = \sqrt{u^2+v^2} \sin \phi$. An important observation is that $a'$ and $c'$ need not be known separately; only their difference is required.

Figure 2:
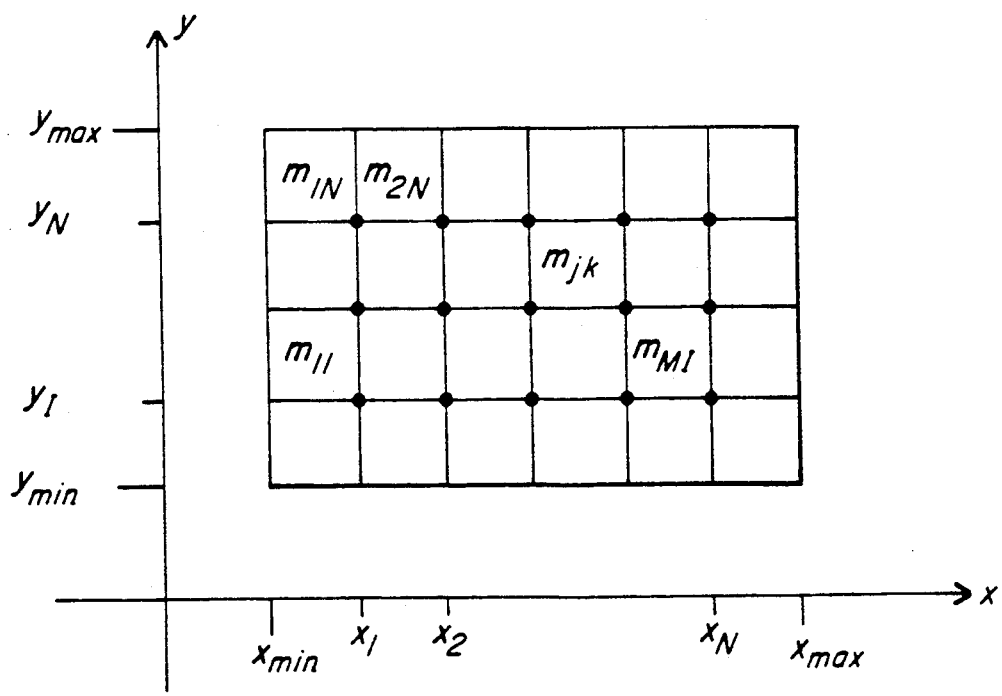
FIG. 2 is a graphical representation of a discrete mass distribution and the notation used to describe it.

Most implementation schemes cannot extract moments directly from a spatially continuous image, because they have a discrete array of photoreceptors. FIG. 2 shows an ideal $M \times N$ discrete mass distribution $\{m_{jk}\}$20, where j and k are related to the corresponding position coordinates $x_j$ and $y_k$ by $$x_j = x_{min} + \left(\frac{j}{M+1}\right)[x_{max} - x_{min}]$$

and $$y_k = y_{min} + \left(\frac{k}{N+1}\right)[y_{max} - y_{min}]$$

for $j=1,2,\ldots,M$ and $k=1,2,\ldots,N$. A corresponding distribution $m(x,y)$ is $$m(x,y) = \sum_{j=1}^{M} \sum_{k=1}^{N} m_{jk}\delta(x - x_j, y - y_k).$$

where $\delta(x,y)$ is the 2-D unit impulse. According to this representation, the moment formulas become $$M_x = \sum_{j=1}^{M} \sum_{k=1}^{N} x_j m_{jk},$$

$$M_y = \sum_{j=1}^{M} \sum_{k=1}^{N} y_k m_{jk},$$

$$M_{x2} = \sum_{j=1}^{M} \sum_{k=1}^{N} x_j^2 m_{jk},$$

$$M_{y2} = \sum_{j=1}^{M} \sum_{k=1}^{N} y_k^2 m_{jk},$$

and $$M_{xy} = \sum_{j=1}^{M} \sum_{k=1}^{N} x_j y_k m_{jk}.$$

The zeroth moment is $$M_0 = \sum_{j=1}^{M} \sum_{k=1}^{N} m_{jk}.$$

With these formulas, the earlier results apply.

For the discrete case, the average intensity level $I_{jk}$ (at each pixel location $(x_j, Y_k)$) is converted to a weight $m_{jk}$ by an intensity conditioning function $f$:

$$m_{jk} = f(I_{jk}).$$

The intensity conditioning function can act to extract the object from the background so that the background does not interfere with the moment calculation. Depending on the particular application, it can also serve to eliminate changes in the 3-D object's projected image as it moves and rotates, such as lighting variations on the surfaces. One intensity conditioning function that does both is the step function $f_1$ shown in FIG. 3 which implements binary imaging (Horn, 1986). If the intensity is below the threshold $I_{th}$, $f_1$ is zero; this can eliminate a dim background. All places where the intensity is above $I_{th}$ get a mass weighting of unity (or any positive constant).

Figure 3A:
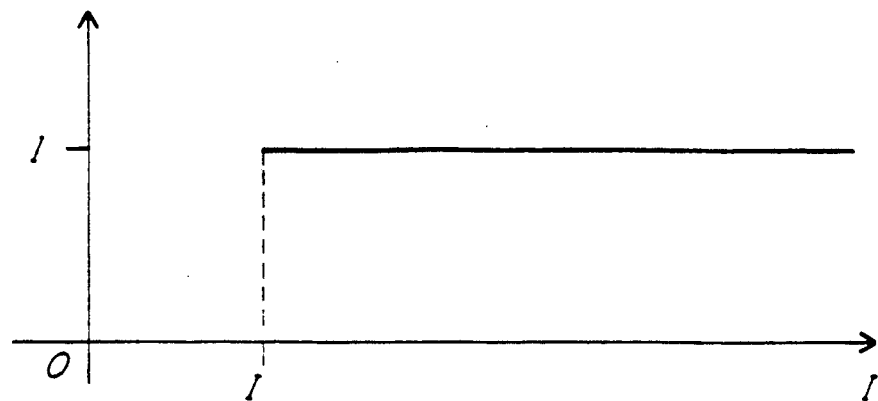
FIG. 3 is a plot of three intensity conditioning functions, one for binary imaging, and two for thresholded gray-level imaging.
Figure 3B:
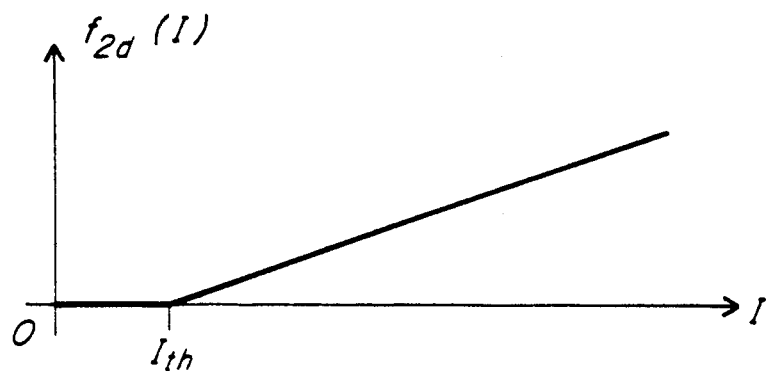
Figure 3C:
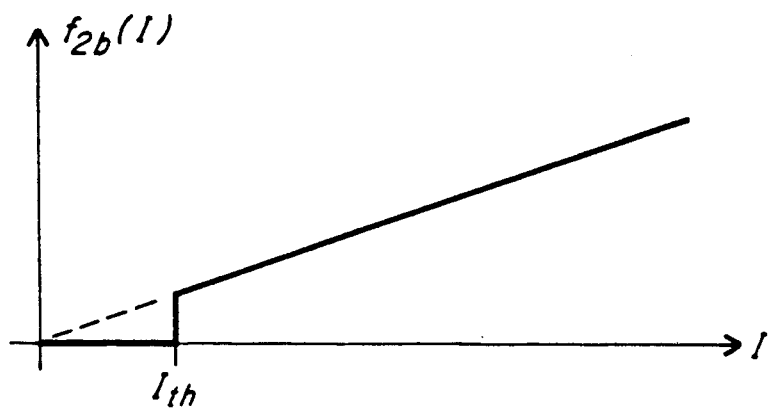

Two other possibilities for $f$, which implement thresholded gray level imaging, are $f_{2a}$ and $f_{2b}$ shown in FIG. 3. An advantage of thresholded gray level imaging over binary is the spatial interpolation effect which results in sub-pixel resolution. A potential disadvantage is the relative lack of imaging consistency; e.g., surface lighting variations are not eliminated.

2. Harmonic Function Theorems for 2-D Resistive Sheet and Grid

The resistive grid implementation scheme of the present invention is based on a property of uniform resistive sheets that is related to harmonic functions, as described in part by B. K. P. Horn in Massachusetts Institute of Technology Artificial Intelligence Laboratory Memo 1071, December 1988. A resistive sheet can be used to reduce the two-dimensional array of intensity data (or mass distribution data) to a one-dimensional line of data at the perimeter, which can then be reduced to a few scalar quantities by resistor lines. This is possible because all of the spatial weighting functions needed to find the necessary moments are harmonic functions.

Continuous Case

Let D be a region in the plane $\{(x,y)\}$ that has a closed, simple boundary $\partial D$. The Laplacian operator $\Delta$ is given by $$\Delta = \frac{\partial^2}{\partial x^2} + \frac{\partial^2}{\partial y^2}.$$

A function $h(x,y)$ defined over $(x,y)\epsilon D$ is harmonic if $\Delta h(x,y)=0$ for all $(x,y)\epsilon D$.

Green's Theorem in 2-D states that if two functions $u_1(x,y)$ and $u_2(x,y)$ are given such that their Laplacians exist over all $(x,y)\epsilon D$, then $$\int\int_D (u_1 \Delta u_2 - u_2 \Delta u_1) dx dy = \int_{\partial D}\left( u_1 \frac{\partial u_2}{\partial n} - u_2 \frac{\partial u_1}{\partial n} \right) ds,$$

where $s$ is the arc length dummy variable (over $\partial D$) and $\partial/\partial n$ takes the directional derivative normal to $\partial D$ and facing outward from D.

Now consider a uniform sheet of resistivity $\rho$ over the region D. Let $i(x,y)$ be the current injected per unit area by a source distributed over D, and let $v_p(x,y)$ be the voltage imposed at the perimeter (e.g. boundary) of the sheet by a source distributed over $\partial D$. The voltage $v(x,y)$ throughout the sheet satisfies Poisson's equation $$\Delta v(x,y) = -\rho i(x,y).$$

The current flux per unit length $j(x,y)$ out of the boundary satisfies $$j(x,y) = -\frac{1}{\rho} \frac{\partial v(x,y)}{\partial n}.$$

Suppose $h(x,y)$ is harmonic. It can be shown that for the resistive sheet system described above, $$\int\int_D h(x,y)i(x,y)dA =$$

$$\int_{\partial D} h(x,y)j(x,y)ds + \int_{\partial D} \frac{1}{\rho} v_p(x,y) \frac{\partial h(x,y)}{\partial n} ds.$$

Also suppose that the resistive sheet system described above has $v_p(x,y)=v_0$ for all $(x,y)\epsilon\partial D$, where $v_0$ is any constant. It can be shown that $$\int\int_D h(x,y)i(x,y)dx\,dy = \int_{\partial d} h(x,y)j(x,y)ds.$$

Discrete Case

The discrete case is treated somewhat differently from the continuous case. Instead of presenting a discrete version of Green's theorem and then applying it to a resistor grid of arbitrary boundary shape, a single theorem is derived for the special case of a rectangular grid. This allows for much simpler notation, because the boundary class is restricted. Yet it shows that an ideal uniform grid can exactly compute sums weighted by (discrete) harmonic functions. The result presented here is derived from difference equations.

Let D be the set of all integer pairs (j,k) such that $0 \leq j \leq M+1$ and $0 \leq k \leq N+1$, where M and N are fixed positive integers. Also let P be the subset of D such that (j,k)$\epsilon$D if and only if (i) j$\epsilon$\{0,M+1\} and $1 \leq k \leq N$, or (ii) k$\epsilon$\{0,N+1\} and $1 \leq j \leq M$.

The (real) function h(j,k) defined over (j,k)$\epsilon$D is harmonic if $$(h(j+1,k) - 2h(j,k) + h(j-1,k)) + (h(j,k+1) - 2h(j,k) + h(j,k-1)) = 0$$

for all (j,k) such that $1 \leq j \leq M$ and $1 \leq k \leq N$. (Actually, h does not have to be defined at the corner nodes. Here it is, but only because it allows simpler notation. The value of h(j,k) at each corner node is arbitrary. They have no effect on whether h is harmonic by the definition used here.)

Figure 4:
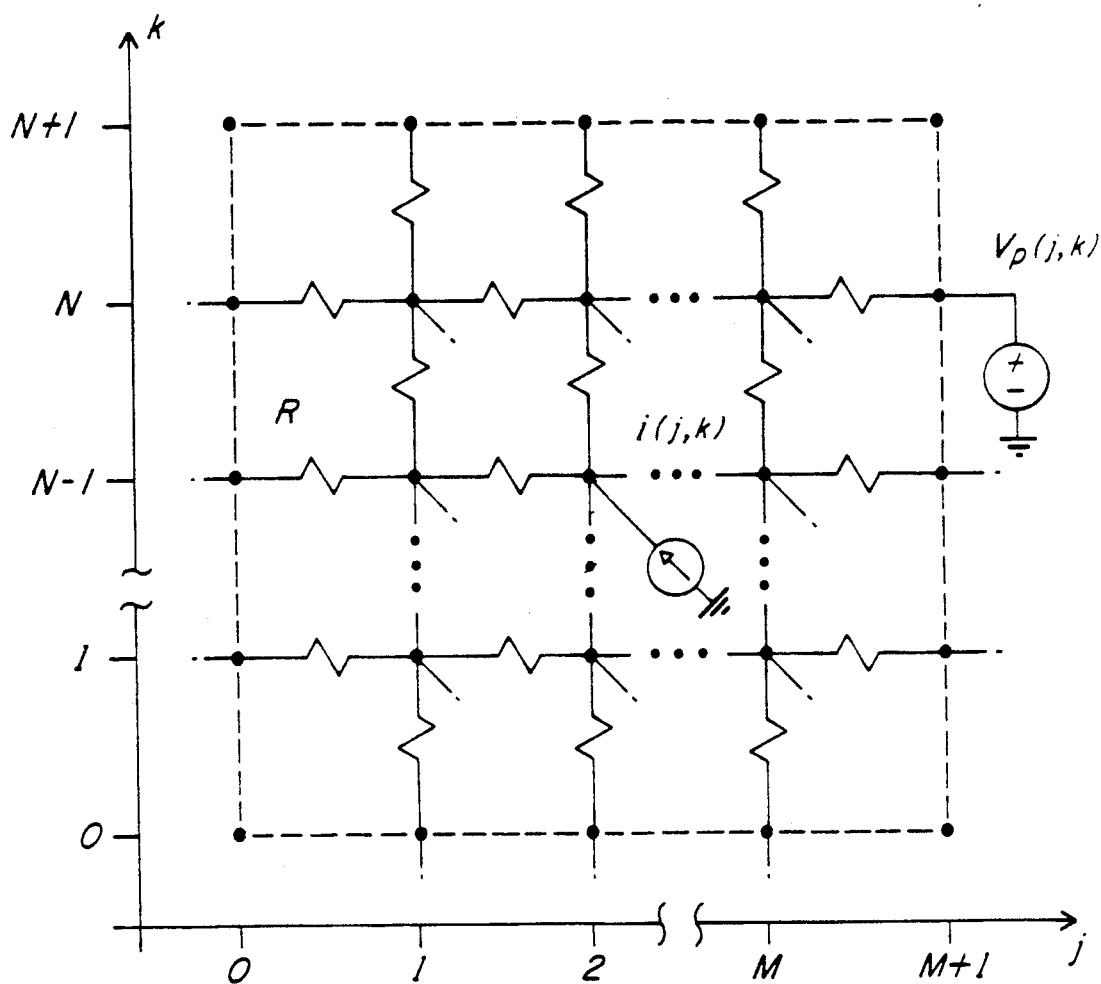
FIG. 4 is a schematic diagram of a resistor grid driven internally by current sources and constrained around the boundary by voltage sources.

FIG. 4 shows an (M+1)×(N+1) resistor grid network 40 with voltage and current sources. It has an M×N array of internal nodes 41 (j=1 to M and k=1 to N), each of which is connected to a current source i(j,k) 42. Note that there are no current sources at the perimeter. There are 2(M+N) boundary nodes 43 (all (j,k)$\epsilon$P), each connected to a voltage source $v_p$(j,k) 44 and to one resistor 45 with current $i_p$(j,k) flowing out of the grid. Note that nothing is connected to the corner nodes.

Suppose h(j,k) is harmonic. If each resistor in the network described above has common value R>0, then it can be shown that $$\sum_{j=1}^{M} \sum_{k=1}^{N} h(j,k) i(j,k) =$$

$$\sum_{(j,k) \epsilon P} h(j,k) +$$

$$R^{-1} \sum_{j=1}^{M} \{v_p(j,0)[h(j,0) - h(j,1)] +$$

$$v_p(j,N+1)[h(j,N+1) - h(j,N)]\} +$$

$$R^{-1} \sum_{k=1}^{N} \{v_p(0,k)[h(0,k) - h(1,k)] +$$

$$v_p(M+1,k)[h(M+1,k) - h(M,k)]\}.$$

Also suppose that $v_p$(j,k)=$v_0$ for all (j,k)$\epsilon$P, where $v_0$ is arbitrary. It can be shown that $$\sum_{j=1}^{M} \sum_{k=1}^{N} h(j,k) i(j,k) = \sum_{(j,k) \epsilon P} h(j,k) i_p(j,k).$$

3. Implementation with Ideal Blocks

The microchip according to the present invention includes a 2-D array of cells that contain photoreceptors. Each cell corresponds to a pixel of the image which is focused on the chip. The light intensity is converted to a current that is analogous to the weighting of the object (via the intensity conditioning function). The currents from all of the cells are fed into a global two-dimensional resistive grid, and the resulting currents exiting around the grid perimeter are buffered and further reduced to a few currents taken off the chip and measured. The appropriate mass moments can be recovered to find the position and orientation.

Figure 5A:
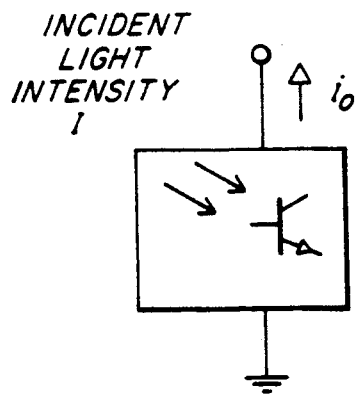
FIG. 5 is a representation of a photoreceptor cell and its ideal model.
Figure 5B:
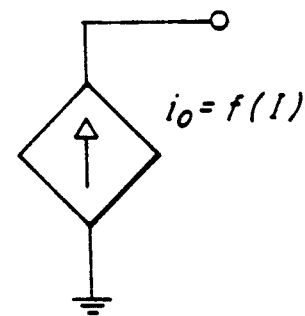

An illustrative implementation includes each of the following ideal blocks (most of which are repeated several times):

Photoreceptor Cell—FIG. 5 shows a photoreceptor cell symbol 50 and ideal circuit model 51. The photoreceptor receives light of intensity I and produces an output current $i_0 = f(I)$, where $f$ is the intensity conditioning function. It can be thought of as a light-controlled current source.

Resistor Grid—The resistor grid is two-dimensional. Each resistor has a common value R>0, and the grid has a uniform layout.

Figure 6A:
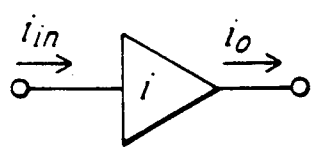
FIG. 6 is a representation of a current buffer and its ideal model.
Figure 6B:
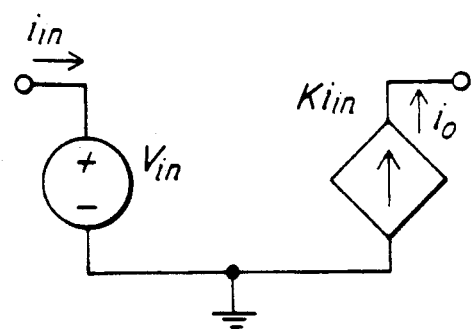

Current Buffer—FIG. 6 shows a current buffer symbol 60 and ideal circuit model 61. The input has zero impedance, and in general can present an "input bias voltage" $v_{in}$ at its port. The output is a current-controlled current source of value $i_0 = K i_{in}$, where $i_{in}$ is the input current and K>0 is the buffer gain. Typically K=1. The output admittance is zero.

Figure 7:
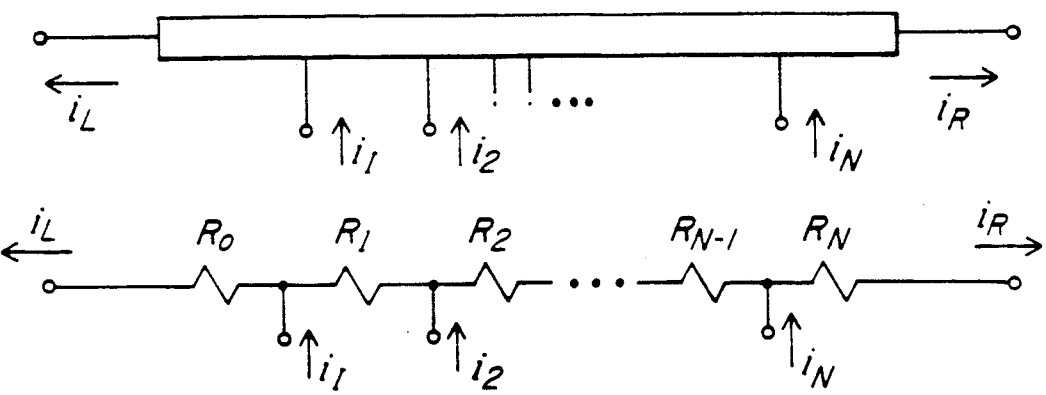
FIG. 7 is a representation of a resistive current divider and its ideal model.

Resistive Current Divider—FIG. 7 shows a current divider symbol 70 and its ideal circuit implementation from a resistive line 71. The resistance, which can be thought of as being lumped or distributed, is linear but not necessarily uniform. The input is a one dimensional array of currents $i_j$, j=1,2, ..., N, and the output is the current pair ($i_L$, $i_R$) exiting from the left and right sides of the divider, respectively. It is assumed that the outputs are connected to ground or to a common voltage source *externally* (this connection is not part of the block). The current $i_j$ for each j gets divided between the left and right outputs in accordance with j. This can be expressed as $$i_R = \sum_{j=1}^{N} S_j i_j \text{ and } i_L = \sum_{j=1}^{N} (1 - S_j) i_j,$$

where $0 \leq S_j \leq 1$ and $S_j$ is monotonically increasing (this can be relaxed to monotonically nondecreasing) with j. Any $S_j$ satisfying these conditions can be realized with positive (this can be relaxed to nonnegative) resistors. The line in FIG. 7 is lumped. It has N+1 resistors (from $R_0$ to $R_N$). The resistances required to realize a given $S_j$, j=1,2, ..., N, are given by $$R_j = R_{tot}(S_{j+1} - S_j),$$

for j=1,2, ..., N, where $S_0 \overset{\Delta}{=} 0$, $S_{N+1} \overset{\Delta}{=} 1$, and $R_{tot}$ is the total resistance of the line.

Figure 8A:
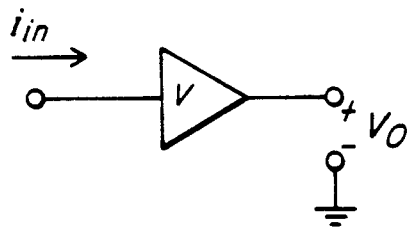
FIG. 8 is a representation of a transresistance amplifier and its ideal model.
Figure 8B:
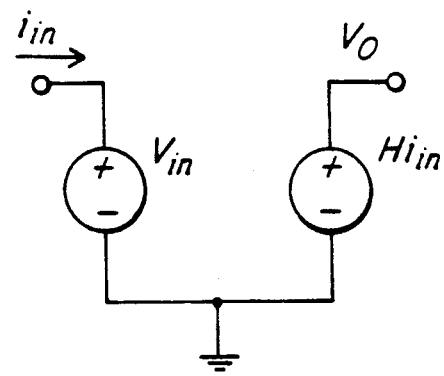

Transresistance Amplifier—FIG. 8 shows a transresistance amplifier symbol 80 and its ideal circuit model 81. As with the current buffer, the input impedance is zero, and in general it imposes a "virtual ground" voltage at its input port 82. The output 83 is connected to a current-controlled voltage source 84 of value $v_o = H i_i$, where H is the gain.

Figure 9:
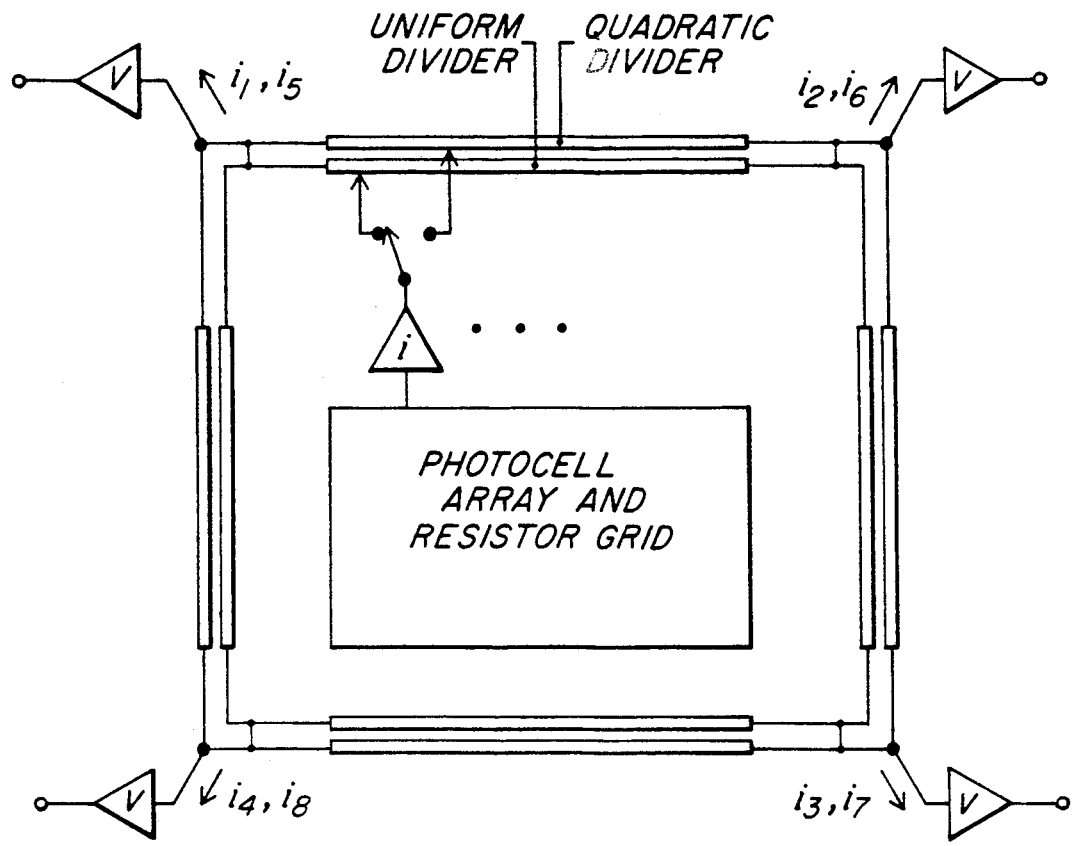
FIG. 9 is a schematic diagram of a basic embodiment of the microchip of the present invention.
Figure 9A:
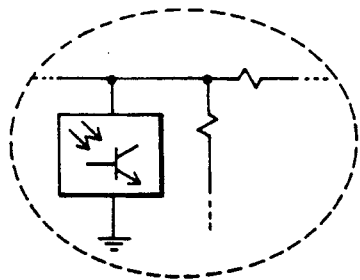

FIG. 9 illustrates the system formed from the constituent blocks. The resistor grid 90 and photoreceptor cell array 91, which occupy most of the chip's area, are overlapped. The output current of each cell is injected into the grid at the nearest node. The current buffers 92 hold the perimeter of the grid at a common voltage (or virtual ground), and the resulting currents out of the grid's perimeter are mirrored by the buffers and fed into the resistive dividers 93. The outputs of the dividers are taken off the chip (as output) and fed into external transresistance amplifiers 94. The final system output is a set of eight analog quantities in the form of voltages, which can easily be multiplexed into a pair of four simultaneous measurements, as illustrated in FIG. 9.

The moment extraction done by this system can be thought of as a two-stage dimensional reduction of data. First, the two-dimensional array of intensity data is reduced to a one-dimensional array of data (in the form of currents) by the resistive grid. Second, this 1-D data array, which is available at the periphery of the grid, is reduced to an essentially zero dimensional set of scalar quantities, or data vector. The term zero dimensional here means that the size of the data vector is a constant, regardless of the array size.

2-D to 1-D Reduction

The array of photoreceptor cells, which acquires the discretely sampled intensity data array $\{I_{jk}\}$ and implements the intensity conditioning function, produces a 2-D current array $i_{jk}$ that is exactly analogous to the discrete mass distribution $m_{jk}$. The relation between the two is simply $$m_{jk} \stackrel{\Delta}{=} i_{jk}$$

Also, the uniform cell layout (and thus the image sampling) corresponds geometrically to the continuous space coordinates (x,y) in FIG. 2 with the relation between (x,y) and (j,k) provided earlier. Thus, the moments can be expressed directly in terms of $\{i_{jk}\}$. But because the resistive grid perimeter is held at a constant voltage by the current buffers, it can be shown that $$\sum_{(j,k)\in P} h(j,k) i_p(j,k) = \sum_{j=1}^{M} \sum_{k=1}^{N} h(j,k) i(j,k).$$

Note the one-to-one mapping between the resistive grid nodes of FIG. 4 and the mass distribution grid of FIG. 2. The functions 1, j, k, jk, and $j^2 - k^2$ are all harmonic, so above results combine to give the following moment formulas in terms of the currents at the grid periphery:

$$M_0 = \sum_{(j,k)\in P} i_p(j,k)$$

$$M_x = M_0 x_{min} + \left(\frac{x_{max} - x_{min}}{M+1}\right) \sum_{(j,k)\in P} j i_p(j,k)$$

$$M_y = M_0 x_{min} + \left(\frac{y_{max} - y_{min}}{N+1}\right) \sum_{(j,k)\in P} k i_p(j,k)$$

$$M_{xy} = M_0 x_{min} y_{min} + (\bar{x} - x_{min}) y_{min} M_y + (\bar{y} - y_{min}) x_{min} M_x +$$

$$\left(\frac{(x_{max} - x_{min})(y_{max} - y_{min})}{(M+1)(N+1)}\right) \sum_{(j,k)\in P} jk i_p(j,k)$$

$$M_x^2 - M_y^2 = (x_{min}^2 - y_{min}^2) M_0 + 2x_{min}(\bar{x} - x_{min}) M_0 -$$

$$2y_{min}(\bar{y} - y_{min}) M_0 + (x_{max} -$$

$$x_{min})^2 \sum_{(j,k)\in P} \left(\frac{j}{(M+1)}\right)^2 i_p(j,k) -$$

$$(y_{max} - y_{min})^2 \sum_{(j,k)\in P} \left(\frac{k}{(N+1)}\right)^2 i_p(j,k)$$

Note that while $M_{x2}$ and $M_{y2}$ cannot be determined separately, their difference can be, which is enough to find the orientation.

The above equations are valid for a rectangular array, and allow different field boundaries. In the prototype implementation discussed below, the designed array is square, and the field coordinates extend from 0 to 100 in both directions. Thus M=N, $x_{min} = y_{min} = 0$, and $x_{max} = y_{max} = 100$, and $$M_x = 100 \sum_{(j,k)\in P} \left(\frac{j}{N+1}\right) i_p(j,k),$$

$$M_y = 100 \sum_{(j,k)\in P} \left(\frac{k}{N+1}\right) i_p(j,k),$$

$$M_{xy} = 10,000 \sum_{(j,k)\in P} \left(\frac{jk}{(N+1)^2}\right) i_p(j,k),$$

$$M_{x2-y2} = 10,000 \sum_{(j,k)\in P} [j/(N+1)]^2 i_p(j,k) -$$

$$10,000 \sum_{(j,k)\in P} [k/(N+1)]^2 i_p(j,k)$$

1-D to 0-D Reduction

The summation terms on the right sides of the last equations for $M_x$ and $M_y$ can be expressed in terms of the currents flowing out of uniform lines, and the terms on the right side of the last equation for $M_{x2-y2}$ can similarly be found using quadratic dividers.

For a uniform line, $S_j = j/(N+1)$, and it can be shown that $$i_R = \sum_{j=1}^{N} \left(\frac{j}{N+1}\right) i_j \text{ and } i_L = \sum_{j=1}^{N} \left(1 - \frac{j}{N+1}\right) i_j.$$

These equations apply directly to the top and bottom lines on the chip as shown in FIG. 9, and are compatible with the corresponding moment formulas. They can also be applied to the lines on the left and right by substituting k for j, and considering $i_R$ as flowing out at the top. The currents $i_1$–$i_4$ flowing out of the chip can then be written as:

$$i_1 = \sum_{j=1}^{N} \left(1 - \frac{j}{N+1}\right) i_p(j,N+1) + \sum_{k=1}^{N} \left(\frac{k}{N+1}\right) i_p(0,k)$$

$$i_2 = \sum_{j=1}^{N} \left(\frac{j}{N+1}\right) i_p(j,N+1) + \sum_{k=1}^{N} \left(\frac{k}{N+1}\right) i_p(N+1,k)$$

$$i_3 = \sum_{j=1}^{N} \left(\frac{j}{N+1}\right) i_p(j,0) + \sum_{k=1}^{N} \left(1 - \frac{k}{N+1}\right) i_p(N+1,k)$$

$$i_4 = \sum_{j=1}^{N} \left(1 - \frac{j}{N+1}\right) i_p(j,0) + \sum_{k=1}^{N} \left(1 - \frac{k}{N+1}\right) i_p(0,k)$$

Therefore, $$i_2 + i_3 = \sum_{j=1}^{N} \left(\frac{j}{N+1}\right)(i_p(j,0) + i_p(j,N+1)) +$$

$$\sum_{k=1}^{N} \left(\frac{N+1}{N+1}\right) i_p(N+1,k)$$

$$= \sum_{j=1}^{N} \left(\frac{j}{N+1}\right)(i_p(j,0) + i_p(j,N+1)) +$$

$$\sum_{k=1}^{N} \left[\left(\frac{j}{N+1}\right) i_p(N+1,k)\right]\bigg|_{j=N+1}.$$

Comparing the right side of the equation with the summation term in the equation for $M_x$ above shows that they are equal (as the perimeter sum vanishes for $j=0$), so that $$M_x = 100(i_2 + i_3).$$

Similarly, $$M_y = 100(i_1 + i_2).$$

In the equation for $M_{xy}$ above, the perimeter sum vanishes if either $j=0$ or $k=0$ (e.g. the bottom and left sides). For the top and right sides, where $k=N+1$ and $j=N+1$, respectively, the total reduces to the right side of $i_2$ above. Thus $$M_{xy} = 10{,}000 i_2.$$

The quadratic lines have $$S_j = \left(\frac{j}{N+1}\right)^2,$$

and the required resistances are $$R_j = (2j+1) R_{tot}/(N+1)^2,$$

where $j = 0, 1, 2, \ldots, N$. It follows that $$i_R = \sum_{j=1}^{N} \left(\frac{j}{N+1}\right)^2 i_j$$

and $$i_L = \sum_{j=1}^{N} \left[1 - \left(\frac{j}{N+1}\right)^2\right] i_j.$$

As with the uniform lines, these apply directly to the dividers on the top and bottom. For the ones on the left and right sides, $i_R$ is the current flowing out at the top. (The higher value resistors are closer to the top for the left and right lines, and are closer to the right for the bottom and top lines.) The corner currents in FIG. 9 are:

$$i_5 =$$

$$\sum_{j=1}^{N} \left[1 - \left(\frac{j}{N+1}\right)^2\right] i_p(j,N+1) + \sum_{k=1}^{N} \left(\frac{k}{N+1}\right)^2 i_p(0,k)$$

$$i_6 = \sum_{j=1}^{N} \left(\frac{j}{N+1}\right)^2 i_p(j,N+1) + \sum_{k=1}^{N} \left(\frac{k}{N+1}\right)^2 i_p(N+1,k)$$

$$i_7 =$$

$$\sum_{j=1}^{N} \left(\frac{j}{N+1}\right)^2 i_p(j,0) + \sum_{k=1}^{N} \left[1 - \left(\frac{k}{N+1}\right)^2\right] i_p(N+1,k)$$

$$i_8 = \sum_{j=1}^{N} \left[1 - \left(\frac{j}{N+1}\right)^2\right] i_p(j,0) +$$

$$\sum_{k=1}^{N} \left[1 - \left(\frac{k}{N+1}\right)^2\right] i_p(0,k)$$

Therefore, $i_7 - i_5$ can be written $$i_7 - i_5 = \left\{\sum_{j=1}^{N} \left(\frac{j}{N+1}\right)^2 [i_p(j,0) + i_p(j,N+1)] + \right.$$

$$\left. \sum_{k=1}^{N} \left(\left(\frac{j}{N+1}\right)^2 i_p(N+1,k)\right)\bigg|_{j=N+1} \right\} -$$

$$\left\{\sum_{k=1}^{N} \left(\frac{k}{N+1}\right)^2 [i_p(N+1,k) + i_p(0,k)] + \right.$$

$$\left. \sum_{j=1}^{N} \left(\left(\frac{k}{N+1}\right)^2 i_p(j,N+1)\right)\bigg|_{k=N+1} \right\}.$$

It follows that $$M_{x^2-y^2} = 10{,}000(i_7 - i_5).$$

FINAL RESULTS

The zeroth moment can be written as $$M_0 = i_1 + i_2 + i_3 + i_4 \text{ or } M_0 = i_5 + i_6 + i_7 + i_8.$$

Ideally, these are equivalent. But to obtain the final moment formulas, they are used selectively in anticipation of certain performance issues discussed below. Using the above results, it can be shown that the centroid coordinates can be expressed as $$\bar{x} = 100 \left(\frac{(i_2 + i_3)}{i_1 + i_2 + i_3 + i_4}\right) \text{ and}$$

$$\bar{y} = 100 \left(\frac{(i_1 + i_2)}{i_1 + i_2 + i_3 + i_4}\right).$$

In addition, it can be shown that $$\frac{2b'}{M_0} = \frac{2(i_2 i_4 - i_1 i_3) \times 10^4}{(i_1 + i_2 + i_3 + i_4)^2},$$

and further that $$\frac{a'-c'}{M_0} = \frac{(i_7 - i_5) \times 10^4}{(i_5 + i_6 + i_7 + i_8)} +$$

$$\frac{(i_1 + 2i_2 + i_3)(i_1 - i_3) \times 10^4}{(i_1 + i_2 + i_3 + i_4)^2}.$$

These last equations are used to calculate the position and orientation. Note that since $i_1+i_2+i_3+i_4$ and $i_5+i_6+i_7+i_8$ are ideally equivalent, currents $i_6$ and $8_8$ need not be determined explicitly in order to calculate either position or orientation.

4. Circuit and Systems Design of a Preferred Embodiment

This section discusses circuit and system design issues for the vision microchip of the present invention, particularly as applied to one embodiment which has been fabricated as a prototype. Those skilled in the art will realize that many modifications and variations are possible within the scope of the invention. In particular, in the above derivations, assumptions which were convenient, but not required, were made for the sake of simplicity. For example, it is not necessary that the grid be square, or even rectangular. A variety of shapes are possible. Also, it is preferred that the voltages imposed at the perimeter of the grid be constant, so as to provide the virtual ground referred to above. However, this is not necessary. The same is true for the voltages imposed at locations in the resistive current dividers. All of these simplifications significantly reduce the complexity of the derivations, but embodiments which do not use one or more of these simplifications are still within the scope of the present invention.

Further, it will be clear to those skilled in the art that values for parameters quoted in this discussion relate to the design and fabrication of the prototype. Details of this nature should not be regarded as requirements or specifications, but rather as appropriate choices for the embodiment presented.

Two sets of chips with test structures and block designs, along with the chips of the final design, were fabricated through MOSIS in a 2 μm CMOS p-well process. The final system chips are each on a die having a 7900 μm × 9200 μm payload area, including the pad frame and the area that surrounds the frame. The image sensor array occupies a 5500 μm × 5500 μm area, which is centered.

The following notation is used: $v_{gs}$, $v_{ds}$, and $v_t$ are the gate-to-source, drain-to-source, and threshold voltages, respectively. For an enhancement-mode PFET, $v_t<0$, and the term above threshold means $v_{gs}-v_t<0$ to first order. If the device is on, then $|v_{gs}-v_t|>0$ is the drive.

Photoreceptor Cell

Figure 10:
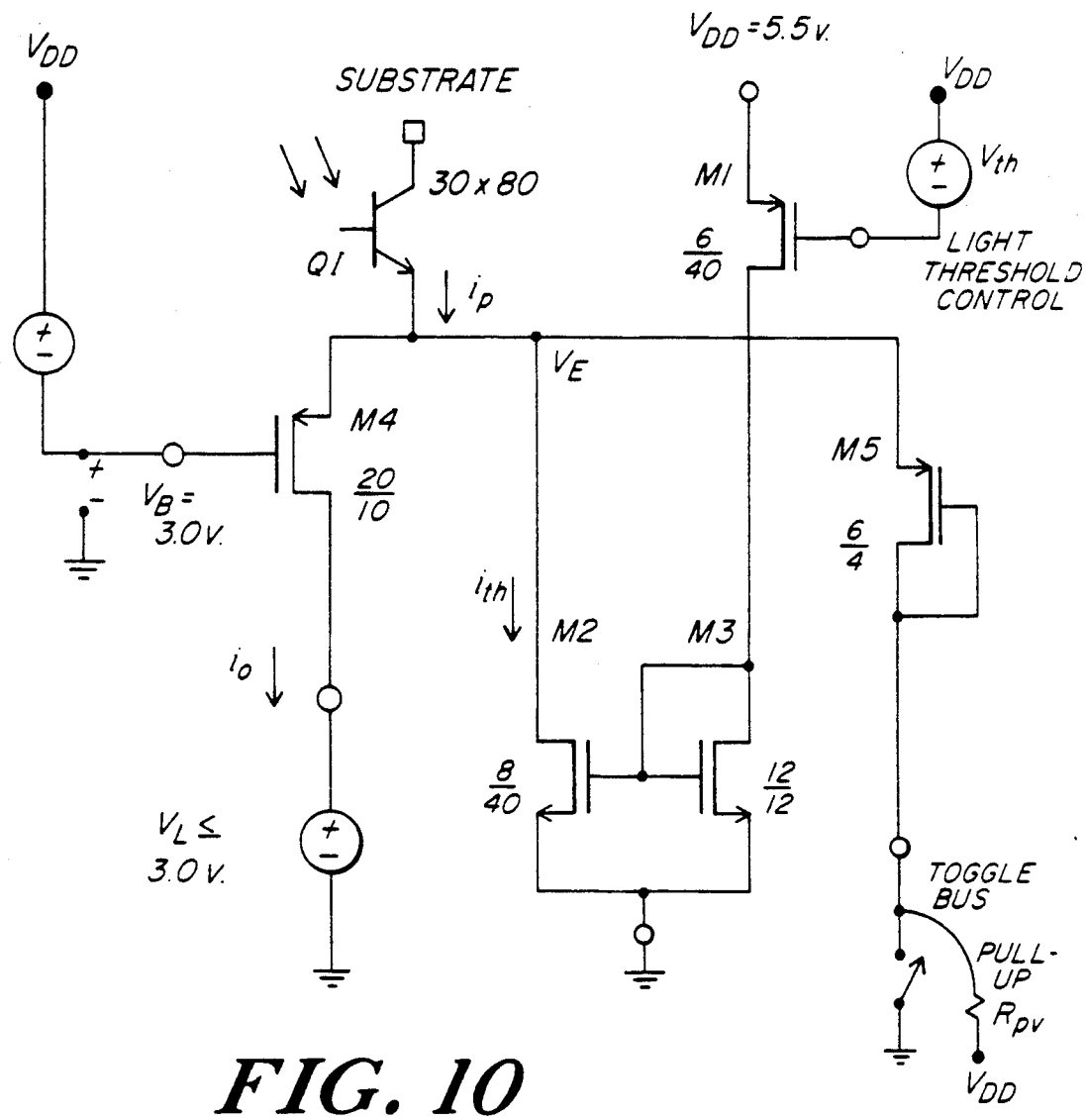
FIG. 10 is a circuit diagram for a photoreceptor cell.

FIG. 10 shows the circuit diagram of a cell that implements the continuous, piecewise-linear intensity conditioning function $f_{2a}$ in FIG. 3. All transistor sizes are in microns. The phototransistor 100 is n+ diffusion in a p-well. Unless otherwise noted, the p-wells are grounded in all circuits. The supply voltage $V_{DD}$ is 5.5 V. The gate of M1 is connected to a global bus (common to all cells in the array); it controls the light threshold $I_{th}$. The current through M1, which depends on the bus voltage, drives the current mirror M2–M3 to give the adjustable thresholding current $i_{th}$, which is approximately independent of $v_E$ (if M2 is in saturation). The gate of M4 is held at a constant voltage of 3.0 V by a second global bus. The drain of M4, which is the cell output, is connected to the resistive grid. In normal operation the grid voltage, shown here as voltage source $v_L$, is at most 3 V (i.e. at or below the gate voltage). Thus, M4 acts like a diode which guarantees that $i_O>0$. The diode-connected PFET M5 goes to a third global bus normally held at $V_{DD}$ so that it is off. (It is actually held a few hundred mV below $V_{DD}$ to provide a margin against substrate voltage drop, which otherwise could forward bias the p-n junction at the drain of M5.) If the phototransistor current $i_p$ is greater than the threshold current $i_{th}$, then M4 turns on and $i_o=i_p-i_{th}$. Otherwise M4 turns off so $i_o=0$. If M4 is on, then $v_E$ (at the emitter of Q1) is about 4.0–4.5 V (in d.c. steady-state), and M2 is in saturation. If M4 is off, then generally $v_E<0.5$ V and M2 is not in saturation (it enters the linear region).

The cell output can be toggled by grounding the bus connected to M5. Current that would otherwise go through M4 instead goes through M5. The bus can actually be up to 1.5 V above ground, and an external resistor can be used to measure this current (to get a direct estimate of the total output current). The toggling feature is useful for cancelling net output offsets in the system.

For normal circuit operation and a reasonable reliability margin, there are limits on $i_p$ and $i_{th}$. There are also recommended nominal ranges for good performance. Maximum values are $i_p=5$ μA and $i_{th}=1$ μA. The nominal range for $i_p$ is 200 nA to 2 μA, and for $i_{th}$ it is 50 nA to 500 nA. Maximum and nominally upper-bounded supply currents are 10 μA and 5 μA per cell, respectively.

Each cell, including its two associated grid resistors, occupies 190 × 190 μm². The area without the resistors is 160 × 160 μm². The phototransistor emitter area is 2400 μm², and the fill factor is about 7%.

It is desirable to run the phototransistors in the range where the d.c. gain β is relatively flat, if possible, to get the best matching properties.

TABLE 1

| transistor current (μA) | ratio | |
|---|---|---|
| | chip #1 | chip #2 |
| .1 | 85 | 76 |
| .3 | 85 | 82 |
| 1.0 | 95 | 88 |
| 3.0 | 100 | 90 |
| 10 | 120 | 105 |

Ratio of phototransistor to photodiode current. Emitter area is 2500 μm².

It is important to keep them out of the low current range (except when the light is below the threshold anyway, so it wouldn't matter), where the β decreases significantly, and if possible, avoid high-level injection. To get an estimate of the β, the tracking ratio between the currents of a phototransistor and a photodiode on the same chip was measured. The transistor was a 50 × 50 μm² n+ diffusion in a p-well, and the diode was a 100 × 100 p+ diffusion in the substrate. Table 1 shows the results for two chips from the same run. Though the diode might have a different light gathering efficiency, it has a linear response and is useful for measuring non-linearities in the transistor. Note that there is a decrease in β as the current is decreased. Since the emitter areas in this experiment and the cell design are about equal, it shows that the cell operates in the desired range, though near the low end.

The phototransistors, of course, will always have some mismatch regardless of how they are run. These can't be eliminated, but smooth gradients in $\beta$ across the chip could be compensated for in the optics. Mismatches of about 10% were measured in transistors spaced 2500 $\mu$m apart, near opposite corners of a small test chip.

For good matching of $i_{th}$ values between different cells, M2 should be run above threshold. To get low currents, M2 is made long and narrow; the resulting square law constant is about 5 $\mu$A/V$^2$. At $v_{gs} - v_t = 0.1$ V, which borders on the transition region, $i_D = 50$ nA approximately. A mismatch experiment for adjacent identical mirrors (M1-M3 or FIG. 10) was performed. The PFET of each mirror had identical source and gate voltages. The results for three chips (of the same fab. run) are shown in Table 2. These values are somewhat higher than what would be expected of mirrors operated well above threshold, but far lower than what subthreshold operation would give.

TABLE 2

| current (nA) | % mismatch | | |
|---|---|---|---|
| | chip #1 | chip #2 | chip #3 |
| 20 | 6 | 4 | 12 |
| 50 | 4 | 3 | 9 |
| 100 | 3.2 | 2.8 | 7.4 |
| 200 | 2.4 | 2.5 | 6.0 |

Mismatches for adjacent current mirrors on three separate chips.

Another issue is the consistency of widely spaced cells on the chip. With M2 running at such a low $v_{gs} - v_t$ drive, the current would be sensitive to variations in $v_t$ over the chip if M2 were driven from a common global bus. For example, if $i_{th} \approx 50$ nA and $v_t$ differs by 50 mV on opposite sides of the chip, then (using $v_{gs} - v_t \approx 100$ mV nominally) the mismatch is about $(125/75)^2$ or 2:1. Though threshold voltage variations are dependent on the process, and the square law accuracy in this low drive region may be questionable, this calculation shows that large global mismatches are a potential problem. In this design it is mitigated by using a ratioed current mirror, such as M2-M3, driven by a transistor that operates at a much higher drive, M1. The drive current of M1 is about $5i_{th}$, and M1 is a PFET so that $|v_{gs} - v_t|$ for M1 is $\sqrt{10} \approx 3$ times higher than for M2. (The conduction constants for saturated PFETs and NFETs of square dimensions are $\approx 10$ and $\approx 20$ $\mu$A/V$^2$, respectively.) Certainly this requires more area. However, global $i_{th}$ mismatches on the order of 2:1 are not desired, even though $i_{th}$ is generally a small fraction of the currents $i_p$ and $i_o$. This is because $i_{th}$ must be adjusted to remove the dark image background over the entire chip; satisfying the worst-case areas where $i_{th}$ is lowest could cause it to be excessive in other areas.

Most of the cell area, excluding that for the grid resistors, is occupied by Q1 (with its guard ring) and the thresholding current source. Reducing the area of one, without compromising performance, increases the area of the other. For example, the area of the current source could be reduced by designing it to run at higher current levels; long transistors and the two-stage current source could be eliminated. But then Q1 would need to run at higher currents, or be amplified with a ratioed current mirror; either modification would require more area, higher scene brightness, or both. This would also increase the dissipation and associated temperature drift effects, especially in other parts of the system, as explained below. There is also the issue of the brightness range over which $i_{th}$ can be maintained at a certain constant percentage of the photocurrent $i_p$ (say 10-20%) while maintaining a certain error bound on $i_o$. Due to system considerations, it is desirable to be able to adjust the image brightness (via the scene lamp intensity) concurrently with the threshold; i.e. the light threshold would always remain at about the same percentage of the maximum scene brightness. For operation in the nominal region, this range is about 5:1 for a 20% threshold current. Because of the issues discussed above, which relate the phototransistor and current source design, this range is directly related to the area required.

The output current has a small variation with the load voltage $v_L$, which is also the grid voltage. It is less than 0.2% per volt for $i_o > 100$ nA; below this (down to 20 nA) it is under 0.5% per volt. The measured Early voltage of the open-base phototransistor is roughly 60 V, but M4 acts as a cascode stage that improves the stiffness. This requires a global bus for the gate bias, but if M4 were simply connected as a diode, it would not have the effect of a cascode. (Also, it would not allow the 1.5 V margin of pull-down voltage in the toggling bus.)

Figure 11:
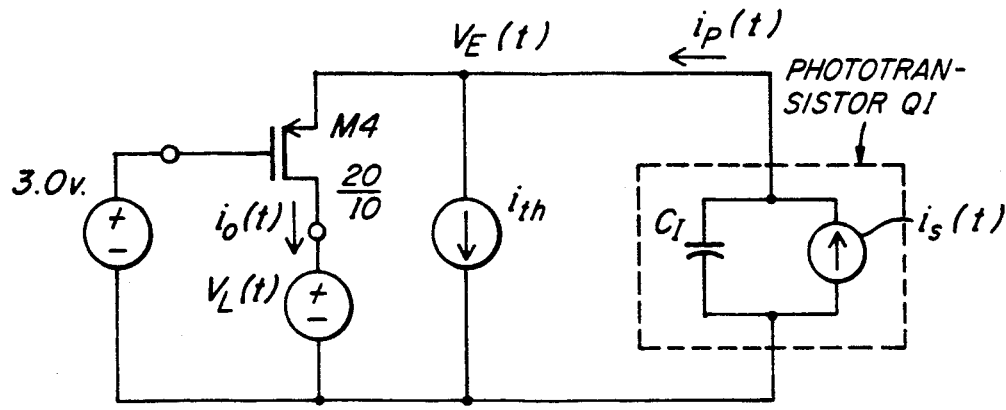
FIG. 11 is a large-signal circuit model for the transient response of the photoreceptor cell of FIG. 10.

The speed is limited primarily by the collector-base capacitance of Q1, along with the effective resistance of M4. FIG. 11 shows a first-order circuit model. Here $C_1 = \beta C_{cb}$, where $C_{cb}$ is the collector-base capacitance. In this model, the current source $i_s(t)$ is proportional to the light intensity I(t) with no dynamics. Normally the grid voltage waveform, shown here as an equivalent voltage source $v_L(t)$, is 3.0 V at most, so that M4 is either in cutoff or saturation. Thus, $v_L(t)$ has a very small effect on the output current waveform and M4 is effectively a nonlinear resistor to ground as seen at its source. (If M4 were diode-connected, this would not be the case, and the cells in the array would not be "dynamically independent.") The incremental source resistance $r_s$ (of M4) is $$r_s = \left(\frac{di_o}{dv_E}\right)^{-1} \approx [(40 \ \mu A/V^2)i_o]^{-\frac{1}{2}}$$

about the d.c. operating point $i_o$, provided $i_o > 200$ nA so that M4 is running above threshold. Sometimes M4 is running at lower currents and is in the transition region, but this speed calculation is just an estimate. Experiments show that $C_1 \approx 30$ pF, so that $$\tau \approx \frac{30 \ pF}{\sqrt{(40 \ \mu A/V^2)i_o}}.$$

For $i_o = 200$ nA, $\tau \approx 12$ $\mu$s.; this is approximate and does not include the effect of base-emitter capacitance. Yet it can be used to estimate settling time for small transitions if $i_o$ remains positive and isn't too low.

During periods when $i_s < i_{th}$, $i_o(t)$ will first settle to zero (if it was initially positive); then $v_E(t)$ will continue to drop below the level at which M4 turns off. Eventually $v_E(t)$ will pass the point where the $i_{th}$ source loses stiffness, i.e. where M2 enters the linear region. It will settle to the point where $i_{th} = i_p$, generally a few tenths of a volt above ground at most. If the brightness then makes a step transition to a level above the threshold, there can be a long delay time for the node voltage $v_E$ to charge to the level where M4 starts to turn on ($\sim 4$ V). This delay can be hundreds of microseconds for nominal current values, which is seen in transient measurements. This drawback can be avoided by limiting the time the light is below threshold. In the sampled-data scheme described below, an LED shining on the chip produces pulses of a certain frequency and duration (say 4 kHz and 50 $\mu$s., respectively). When the LED is off, the cell outputs settle to their steady-state values and the chip output is sampled. After sampling, the LED turns on to "reset" all the cells to a state where $i_o > 0$. This keeps $v_E(t)$ from sinking too low, which could otherwise happen if an area of the image remains dark for too long. (Alternatively, an extra transistor in the cell could do essentially the same thing the LED does, but then a potential problem is the turn-on time of Q1 for a very dark image pixel.)

The speed depends primarily on the phototransistor, the brightness it is run at, and the sizing of M4. The W/L for M4 must be large enough so that Q1 doesn't saturate, yet L should not be too small (so it is a good cascoding transistor). As it is, the maximum $i_o = 5$ $\mu$A happens at drive $|v_{gs} - v_t| \approx 0.5$ V; the voltage margin is such that $i_o$ saturates at about 25 $\mu$A if $V_{DD} = 5.0$ V (which was measured).

Current Buffer

Figure 12:
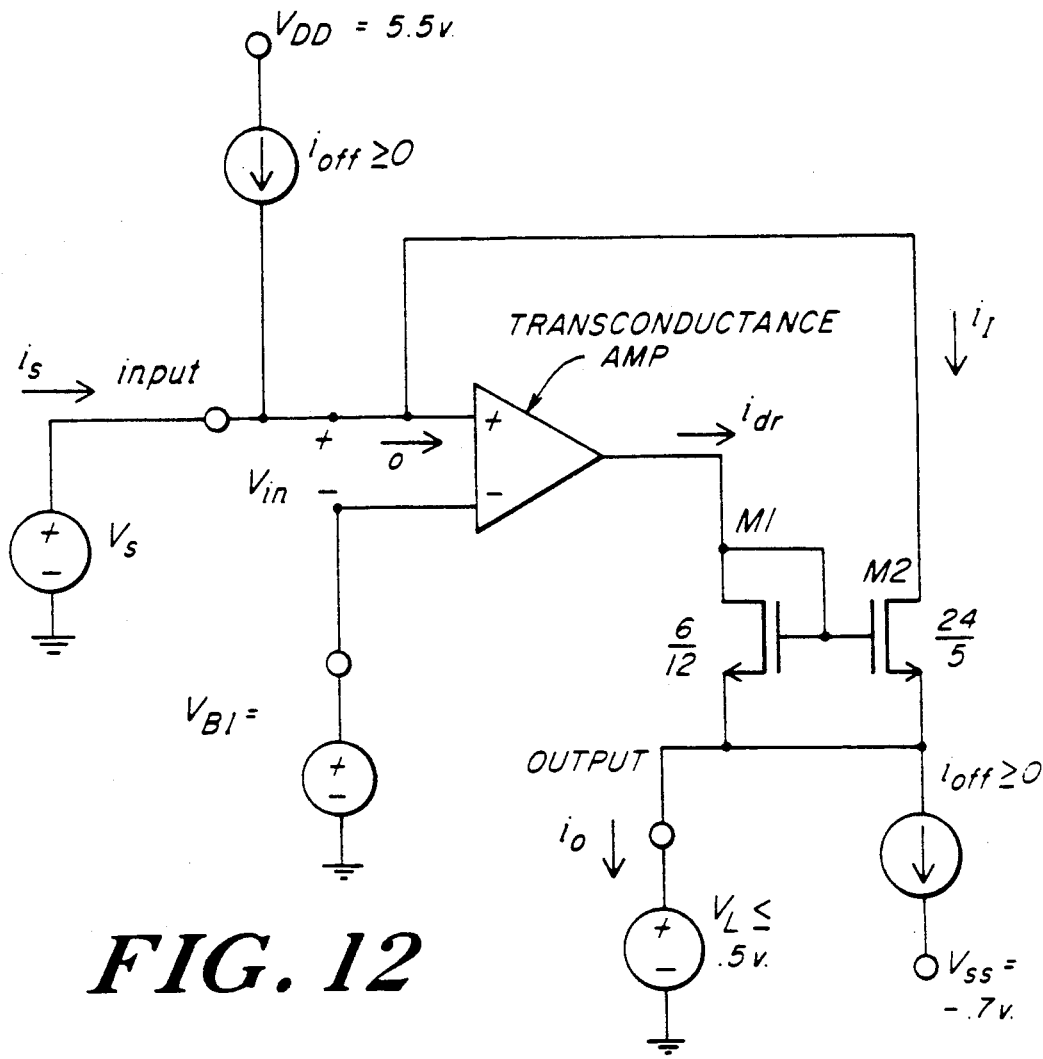
FIG. 12 is a circuit block diagram of a current buffer.

FIG. 12 shows a diagram of the current buffer in a mixed circuit-block form. The input is connected to a test voltage source $v_s$; this allows a feedforward analysis of the d.c. properties. For simplicity, first assume $i_{off} = 0$. A global bus provides a bias voltage to the negative input of the transamp (which is common to all buffers). The difference $v_{in} = v_s - v_{B1}$ at the transamp input causes a driver current $i_{dr}$ to flow into the mirror M1-M2, and the resulting current $i_1$ flows into the buffer input from the source $v_s$ (i.e. $i_s = i_1$ because $i_{off} = 0$). The output current is $i_o = i_1 + i_{dr}$, or $$i_o = Ki_1, K \stackrel{\Delta}{=} 1 + \frac{i_{dr}}{i_1}.$$

To first order, K is constant. The mirror ratio is $i_1/i_{dr} \approx 12$, therefore, $K \approx 1.08$.

The transamp can be modeled with d.c. transfer curve $$i_{dr} = f(v_{in}),$$

where $f$ is a sigmoid for $v_{in} \geq 0$, and $f(v_{in}) = 0$ for $v_{in} < 0$ as neither $i_1$ nor $i_{dr}$ can be negative. Therefore, $$i_1 = (i_1/i_{dr})f(v_{in})$$

so that $i_s \approx 12f(v_s - v_B)$. Note that for $v_{in} < 0$, $i_s = 0$. For $v_s > 0$, $i_s$ is approximately linear with $v_{in}$; it tapers at higher values of $v_s$. The circuit is designed to drive an output current of up to 20 $\mu$A into a load voltage of up to 0.5 V above ground, though $i_1 < 10$ $\mu$A in almost all imaging cases. The transamp is always running near the origin of its v-i transfer curve, where it is approximately linear; it never goes near the saturation region. The input conductance $g_{in}$ about an operating point is $g_{in} \stackrel{\Delta}{=} di_s/dv_s \approx 12f'(v_s - v_B)$. (Though the load is actually a resistive line, the source $v_L$ is assumed to be constant here. The effects of changing $v_L$ are discussed below.) The transamp $g_m = f'(v_s - v_B) \approx 25$ $\mu$S in the linear region, so that $g_{in} \approx 300$ $\mu$S, which is about a 3 k$\Omega$ input resistance.

The incremental $g_m$ varies by about 15% over the 1-10 $\mu$A range of $i_1$, but a more significant measure of linearity errors is the variation of the chord resistance about an operating point of relatively low current, as explained below. For $i_1$ over the 1-10 $\mu$A range, the total measured variation of chord resistance about the 2 $\mu$A point was 5% maximum for the three chips tested. (As $i_1 \to 2$ $\mu$A, the chord resistance approaches the incremental resistance.)

On a complete system chip, there are mismatches of input offset voltages between buffers; these are due to the random mismatches in the transamps. Since all the inputs are connected to a common resistive grid, some buffers will be in the cutoff state depending on the image and toggling state of the cells. Certainly this is not good for the accuracy. The two current sources $i_{off}$, one at the input and one at the output, can guarantee that all the buffers are on, i.e. that $i_1 > 0$, if $i_{off}$ is sufficient. Consider the worst-case situation in which adjacent pairs of buffers have the maximum input offset mismatch $V_{off}$. In other words, as a row of buffers is traversed, the offset alternates between two values $v_{off}^{(a)}$ and $v_{off}^{(b)}$, and $V_{off} = |v_{off}^{(a)} - v_{off}^{(b)}|$. If $R_g$ is the grid resistor value and $R_{in}$ is the buffer input resistance, respectively, then $I_{off}$, the minimum $i_{off}$ needed, is about $$I_{off} \approx \frac{V_{off}}{2(R_g + R_{in})}.$$

Using $R_g = 3$ k$\Omega$, $R_{in} = 3$ k$\Omega$, and $V_{off} \approx 25$ mV, $I_{off} \approx 2$ $\mu$A. This is the level at which the cut-off buffers would just start to turn on. In this design, $i_{off} \approx 4$ $\mu$A was chosen so that most buffers would have $i_1 > 2$ $\mu$A (though others could have $i_1 \approx 6$ $\mu$A even when the cells are toggled off). Also it gives a margin against uncertainties in $V_{off}$, which was actually 30 mV in a set of four test chips. Though the worst case situation just described would never occur on a chip, it could come close for small groups of adjacent buffers. As explained later, there are reasons why $i_{off}$ should not be any higher than it needs to be. Note that the input voltage offsets can affect the chip output, as the sinking sources at the output are not exactly matched to $i_1$ at each buffer, but these variations are mostly cancelled. Even without input offset voltages, there would still be a systematic net output current of $Ki_{off}^{(a)} - i_{off}^{(b)} \neq 0$, where $i_{off}^{(a)}$ and $i_{off}^{(b)}$ are the sourcing and sinking currents.

Supply current from $V_{DD}$ is at most 20 $\mu$A per buffer if $i_{off} < 6$ $\mu$A. The current to $V_{SS}(-0.5$ to $-0.8$ V.) is about $2i_{off} \leq 12$ $\mu$A.

Total buffer area is about $700 \times 190$ $\mu$m², including overhead for bussing.

TABLE 3

| $i_s$ ($\mu$A) | $|\Delta i_o / \Delta v_L|$ | | |
|---|---|---|---|
| | chip #1 | chip #2 | chip #3 |
| 1 | .02 | .02 | .02 |
| 2 | .04 | .03 | .03 |
| 5 | .06 | .07 | .06 |
| 10 | .12 | .10 | .09 |
| 20 | .16 | .16 | .13 |

Output conductance versus $i_s$, with $i_{off} = 0$.

Figure 13:
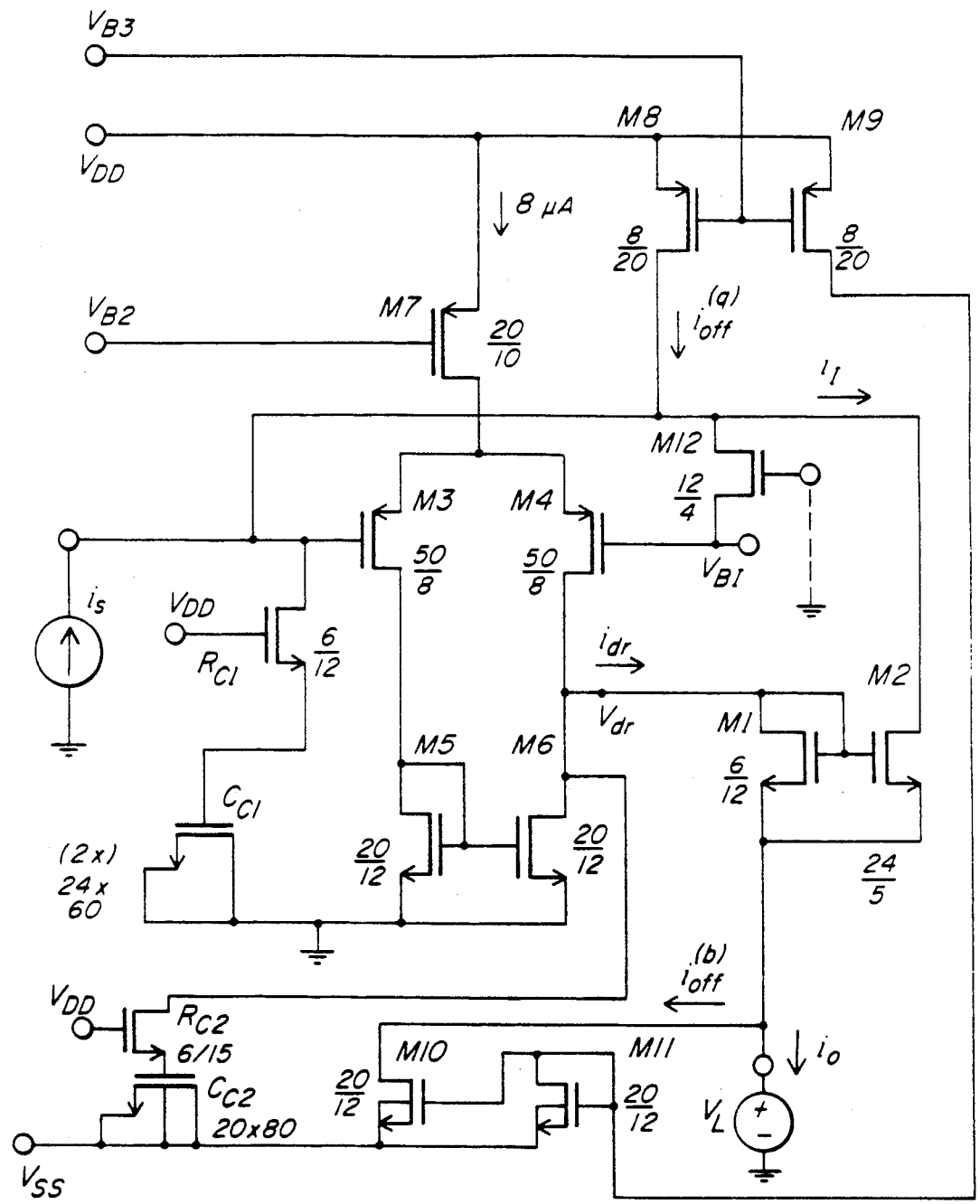
FIG. 13 is a complete transistor schematic of a current buffer cell.

FIG. 13 shows the transistor schematic of the buffer; not shown are the PFETs at the corners of the chip which generate $V_{B1}$, $V_{B2}$, and $V_{B3}$ from external current sources. Transistors M3-M7 form the transamp, and M8-M11 form the offsetting current source pair. Note that the buffer is now being driven by a test current source $i_s$.

Consider the effect of perturbing $v_L$ while holding $i_s$ constant. The current $i_1 = i_s + i_{off}^{(a)}$ changes negligibly, because $v_{ds}$ of M8 is essentially constant. Thus, the output conductance is $$-\left.\frac{\partial i_o}{\partial v_L}\right|_{i_s} \approx \left.\frac{\partial i_{off}^{(b)}}{\partial v_L}\right. - \left.\frac{\partial i_{dr}}{\partial v_L}\right|_{i_1}.$$

The first term on the right side depends on the conductance of M10 (at constant $v_{gs}$), and the second term depends only on the mirror M1-M2. More specifically, the second term depends on the conductance of M2 (at constant $v_{gs}$), the incremental current gain ($\partial i_1/\partial i_{dr}$), and the body (or back gate) effect discrepancy between M1 and M2. Qualitatively, the conductance of M2 essentially gets *divided* by the mirror gain, because $i_{dr}$ changes, not $i_1$. This contribution is negative. However, the measured values (below) are positive, even with $i_{off} = 0$, so the body effect mismatch has an effect.

Table 3 shows measured values of the large signal output conductance, taken between $v_L = 0.0$ V and $v_L = 0.5$ V at different values of $i_s$, all for $i_{off} = 0$. Consistency is typically 20% for the three chips tested. At $i_{off} = 4$ μA and $i_s = 0$ (so $i_1 = 4$ μA), $\Delta i_o/\Delta v_L \approx 0.15$ μS. (about 7 MΩ). Thus the net output resistance at the usual operating condition $i_{off} = 4$ μA is about 5-10 MΩ for $i_s$ between 1 and 10 μA. Of course, the larger $i_{off}$ is, the more it adds to the output conductance, which is one reason it shouldn't be any higher than it needs to be.

Another effect of perturbing $v_L$ (at constant $i_s$) is the change of $v_{in}$ at the input, which is due to the reverse voltage gain. This appears through the change in $i_{dr}$ needed to hold $i_1$ constant, along with the transamp output conductance. It is straightforward to show that, based on the approximation $$\left.\frac{\partial v_{dr}}{\partial v_L}\right|_{i_1} \approx 1,$$

the reverse voltage gain is $$\left.\frac{\partial v_s}{\partial v_L}\right|_{i_s} \approx \frac{1}{g_m}\left(\left.\frac{\partial i_{dr}}{\partial v_L}\right|_{i_1} + g_o\right)$$

where $g_m$ and $g_o$ are the transconductance and output conductance of the transamp, respectively. Note that this also depends on the mirror. Measured values range from about 0.001 at $i_1 = 20$ μA to 0.007 at $i_1 = 0.5$ μA.

The current gain $K = i_o/i_1$ is not exactly constant because the mirror ratio $i_{dr}/i_1$ will change with $i_1$ even if $v_L$ is held constant. This is caused by the sizing discrepancy between M1 and M2, combined with higher-order transistor effects. The mirror is designed so that M1 and M2 would run above threshold at currents of $i_1 > 1$ μA, and to get a high gain ratio $i_1/i_{dr}$ without M1 being too long and narrow. The error should be negligible, as it generally cancels in many imaging situations. Note that the "reduction factor" $i_{dr}/i_1 \approx 1/12$ also applies to this error; e.g., a 2% change in this would give about a 0.2% change in K.

Area is a major factor that limits performance, as is the low $V_{DD}$ (for the digital fab. process) which means that many transistors must run at low $|v_{gs} - v_t|$ drives. Consider the transamp, for example. To get a relatively high $g_m$ and low offset voltage mismatch for a given supply current, M3 and M4 are run at $|v_{gs} - v_t| \approx 0.2$ V; also M5 and M6 have $v_{gs} - v_t < 0.5$ V. But to keep $g_o$ low, M4 and M6 (matched to M3 and M5) can't be too short. Any tightening of these two requirements implies wider transistors and thus more area. Similarly, M10 should be in saturation even if $v_L = 0$; M10 and M11 share a separate p-well tied to their sources and held at $V_{SS} = -0.7$ V. Again this requires low drive and wide transistors that can't be made too short because of the output conductance issue.

The total current draw from $V_{DD}$ is evenly divided between the transamp and off-setting source pair. The transamp bias current through M7 should be much larger than the maximum output needed ($i_{dr} = 1.5$ μA) for good input resistance linearity; here it is 8 μA. The offsetting sources $i_{off}^{(a)}$ and $i_{off}^{(b)}$ use transistors of equal sizings for good thermal tracking and drift cancellation; nominally they draw $2i_{off} \approx 8$ μA from the $V_{DD}$ and $V_{SS}$ supplies.

The buffer is compensated to avoid the potential problem of spurious oscillations. Consider the driving-point admittance at the input of the buffer, as would appear at the port connected to a test voltage source $v_s$ (see FIG. 12), assuming $v_L$ is held at a constant d.c. value. (Alternatively, the impedance as seen by the test current source $i_s$ could be used.) The port can then be thought of as a feedforward block with voltage as the input and current as the output. For the following discussion, assume that the transamp and the mirror are ideal with regard to their d.c. properties. Amplifier phase lag at high frequencies causes a related lag in the driving-point admittance $Y(j\omega)$. Without compensation, there are frequencies at which $-180° < \angle Y(j\omega) < -90°$. Thus, it appears both *active* and *inductive*, which could cause sustained oscillations when connected to the grid, which has distributed capacitance. Compensation can be designed that makes $Y(j\omega)$ passive, though with a low-Q parallel RLC character. Compensation elements $R_{C1} \approx 20$ kΩ and capacitor $C_{C1} \approx 2.5$ pF, connected in series (FIG. 13) absorb real power above about 2 MHz. The transamp compensation $R_{C2} \approx 20$ kΩ and $C_{C2} \approx 1.5$ pF affects its *contribution* to $Y(j\omega)$ as follows. Without $R_{C1}$ and $C_{C1}$, Re $\{Y(j\omega)\}$ would go negative for sufficiently high $\omega$, but the compensation $R_{C2}$ and $C_{C2}$ reduces $|Y(j\omega)|$ (and introduces some phase lead) so that Re $\{Y(j\omega)\}$ has a higher minimum; it doesn't go as far negative as in the uncompensated case. This makes it possible to add the series $R_{C1} - C_{C1}$ admittance in parallel to make the total admittance look passive, while using a reasonable amount of area. Using only $R_{C1}$ and $C_{C1}$ would work, but would require excessive area, because it must provide a far greater positive or "damping" admittance, and also must cut in at a much lower frequency. The scheme used here does, however, result in a resonance notch in the admittance, which occurs at $f_0 \approx 3$ MHz and has $Q \approx 4$, and depends on the bias point (as verified by SPICE simulations using parameters from earlier runs of the same process.) To avoid nonlinear effects that might sustain a large-signal oscillation, the pass transistor M12 can be used to short the input to a low-impedance or strongly bypassed bias source $V_{B1}$. Normally this "damper" is off. A single pin connects all the gates. Depending on the output circuitry, e.g. the external amps., oscillations in the MHz range might not show directly; instead they could be manifested as large errors in the d.c. steady-state output. The damper was never used.

The buffer output is connected to three pass transistors that can steer $i_o$ to either the uniform or quadratic resistive lines, or to a dummy bus. The dummy bus is potentially useful for testing and diagnostics; and in the experiments, it was used to measure the total current out of each side of the grid. The transistors feeding the resistive lines are 20/4 NFETs, with $R_{on} \cong 1$ k$\Omega$, and the one feeding the dummy bus is a 10/4 NFET with $R_{on} \cong 2$ k$\Omega$. The gates are switched between ground and $V_{DD}$.

Transresistance Amp

Figure 14:
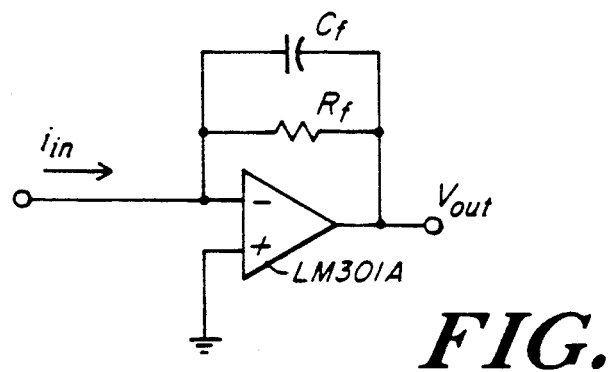
FIG. 14 is a circuit diagram of a transresistance amplifier.

The transresistance amp is a simple op-amp circuit shown in FIG. 14. Here $R_f = 22$ k$\Omega$ and $C_f = 470$ pF to give a settling time constant $\tau \cong 10$ $\mu$s. This bandlimiting reduces noise in the unused high frequency range. The LM301A op-amp used here is compensated with one 100 pF capacitor (about 3 times the recommended minimum).

Input offset voltage and bias current errors are cancelled because of the cell toggling feature, but the drifts are a potential error source. If $R_f$ is large enough, and cell toggling (for offset measurement and subsequent cancellation) is done often enough, the drift errors are negligible. But if $R_f$ is too large, the input resistance $R_{in} \cong R_f/A$ (where A is the op-amp open loop voltage gain) might become significant. Here $A > 25$ k so that $R_{in} < 1$ $\Omega$. This is a potential issue in the design of the resistive lines on the chip, which drive these amplifiers. Mismatches in $R_f$ between amps, say if four separate ones are used to measure the output currents, can cause error, but in principle these can be cancelled by calibration in system software. For the measurements in this work, a single amp was used, and the input currents were multiplexed with mechanical switches. This eliminated all errors, except drifts and nonlinearity in $R_f$ (which is a ¼ Watt carbon film resistor in the experiments here).

Resistor Grid

Each resistor is a polysilicon strip 4 $\mu$m wide and about 600 $\mu$m long; at 20 $\Omega$ per square this is $R_g \cong 3$ k$\Omega$. The total grid size is $30 \times 30$, which corresponds to $N = 29$. Each cell in the $29 \times 29$ array is associated with a pair of resistors, and the grid is completed by a row and column of dummy cells (having resistors only) on the bottom and left sides of the array. Of the $190 \times 190$ $\mu$m$^2$ total area for each cell-resistor group, a $160 \times 160$ $\mu$m$^2$ area is occupied by the cell itself. The rest is for the resistors, which are each laid out in an identical pattern; there is no discrepancy between the patterns of the horizontally and vertically oriented ones.

Several constraints are involved in the design of the grid. Issues include resistor material and sizing, grid size, voltage range, associated cell errors, and associated buffer errors.

For best matching, polysilicon or well resistors are preferred. Polysilicon has a low resistivity but it is free from layout problems such as well spacing, and typically has a lower temperature coefficient. Even though the resistors are narrow (4 $\mu$m) in this design (which give relatively high random mismatches), they are long; this has a statistical cancellation effect. Yet well resistors are a strong candidate for the grid, and could be used in other embodiments.

The grid size N is strongly related to the performance. If N is small, the computation resolution is small, which limits the accuracy. But the area available for the entire array, which is most of the total chip area, is approximately constrained to be constant. As N is made larger, the area for each resistor-cell group goes down. For a given $R_g$, reducing the area causes the mismatches to increase, because smaller dimensions are needed. The cell design also becomes more difficult as the area is reduced. Because area is a major factor in the cell design, N should not be any larger than necessary. There is a critical N above which discrete resolution errors become insignificant compared to resistor mismatch errors. There is no firm cutoff point, but it is estimated at $N \approx 30$ for the orientation task. The critical N is much higher for the position task, but orientation has priority in the design. It might also depend on the object size and shape; larger objects favor a higher N.

Current injected into the grid will cause a voltage to develop on the internal nodes, above the voltage on the perimeter. If the voltage gets too high at any node, cell operation might not be normal; e.g., source stiffness could deteriorate. Suppose a current $i_g$ is injected into the grid uniformly—that is, $i_g/N^2$ goes into each node. It can be shown that the maximum voltage $\Delta v_g$ above the perimeter is about $\Delta v_g \cong 0.08 R_g i_g$, which occurs at the center of the array. At $i_g = 2$ mA and $R_g = 3$ k$\Omega$, $\Delta v_g \cong 0.5$ V. Here the highest grid voltage is about 3.0 V above ground (recall $v_L \leq 3.0$ V from §3.2 for normal cell operation); this allows 2 $\mu$A from each cell with all on at once. Only for the smallest objects would there be more current from each cell, and then only a small fraction of all the cells would be on (except possibly during an LED light pulse, but this doesn't matter). This is a worst-case, conservative design. But if $R_g$ were to be increased significantly, either restrictions on the imaging, increased voltage range, or both would be needed.

The grid voltage also affects the cell output currents. This can be thought of as a distortion of the image brightness distribution. The cell outputs are stiff enough that generally the resulting error is under about 0.2% (from $\Delta v_g \times 0.5\%$ per volt); this error is considered negligible in this design. However, in a design with a much larger grid voltage range and $R_g$, this might not be the case.

The current buffers cause errors that increase as $R_g$ is decreased. One source of error is the reverse voltage gain, which is treated below. Another is the input resistance $R_{in}$, which can be thought of as an extension of the grid. First consider the effect of $R_{in}$ by assuming it is ideal, i.e. linear and matched for all buffers. It turns out to be *almost* equivalent to making the grid slightly larger (which, if it were exact, would have no effect on the orientation and just a scaling effect on the position). The error introduced can be corrected by measuring the total current out of each side of the grid; the necessary equations can be derived from the harmonic function theorem in the discrete case. Certainly $R_{in}$ becomes more significant as $R_g$ is decreased. Test results have shown that with the design as it is, the correction has no significant improvement, except in special cases. The input resistance is generally not a dominant effect, but lowering $R_g$, e.g. to save area, could make it significant for a border class of images.

A second issue is the linearity of $R_{in}$. If $R_{in}$ is itself large enough to sometimes be significant, then large nonlinearities, which are effectively changes in $R_{in}$ with the image, could degrade the performance. (Quantitatively, it is the chord resistance variation that counts, because the system output is the difference resulting from the cell outputs being toggled on and off. When the cells are off, the net buffer offsetting current flows through the system.) This is especially true if the object is near the edge of the field, where much of the current goes through just a few buffers. At 2 $\mu$A per cell, there could be almost 20 $\mu$A per buffer near the object. (This is based on the conservative "worst-case" situation of 2 $\mu$A per cell throughout the array, which gives $\approx$20 $\mu$A per buffer on the average, yet this also approximates the maximum because of the nearly uniform distribution of perimeter currents.) Buffer circuits having a highly nonlinear $R_{in}$ generally should be avoided. An exception could be made if $R_{in} \ll R_g$, though other problems (e.g. the resulting increased offsetting requirement) discussed previously must still be considered.

The following is an overview of the issues. To minimize the error due to the current buffers, $R_g$ should be as high as possible. However, for a given range of operating currents, $R_g$ is limited by the available voltage range of the cells. The grid size is chosen relatively small to allow a large area for each resistor, so that polysilicon can be used, and as explained later, the undesirable effects of a small grid are mitigated with the imaging scheme.

Resistive Current Dividers

All four uniform lines are identical. The total or end-to-end resistance is $R_{tot} \cong 4.5$ k$\Omega$. Each of the 30 resistors has $R_j = 150$ $\Omega$, and is 90 $\mu$m long by 12 $\mu$m wide.

In this embodiment all four quadratic lines are identical, and are oriented as explained above. The required resistances are $$R_j = (2j + 1)\left(\frac{R_{tot}}{(N+1)^2}\right),$$

$j = 0, 1, 2, \ldots, 29$. Here $R_{tot} \cong 4.5$ k$\Omega$, which is the same as for the uniform lines, so that $$R_j \approx (2j+1)(5 \ \Omega).$$

Each $R_j$ is made from one or more resistors in a set of primitives. The larger values are made by connecting selected primitives in series. The primitive set consists of i) resistors of value $R_j$ for $j = 0, 1, 2, \ldots, 5$; and ii) a 60 $\Omega$ resistor (i.e. $12 \times (5 \ \Omega)$). The lowest six resistors are each just the corresponding primitive. For the remaining resistors, j can be written as a base six integer, $j = 6a_1 + a_0$, where $a_0 = 0, 1, \ldots, 5$, to obtain $$R_j = [12a_1 + (2a_0 + 1)]\left(\frac{R_{tot}}{(N+1)^2}\right).$$

Using $R_{tot} = 4.5$ k$\Omega$ and $N = 29$ gives $$R_j \approx [(2a_0+1)(5 \ \Omega)] + a_1(60 \ \Omega).$$

Each $R_j$ is made from a primitive $R_{a0}$ in series with $a_1$ identical 60 $\Omega$ resistors. For example, $R_{22}$ has $j = 22 = 6(3) + 4$ so that $a_0 = 4$ and $a_1 = 3$; it is made from an $R_4$ primitive and three 60 $\Omega$ resistors, all connected in series. Note that the above relations apply even if $j < 6$, in which case $a_1 = 0$.

Figure 15:
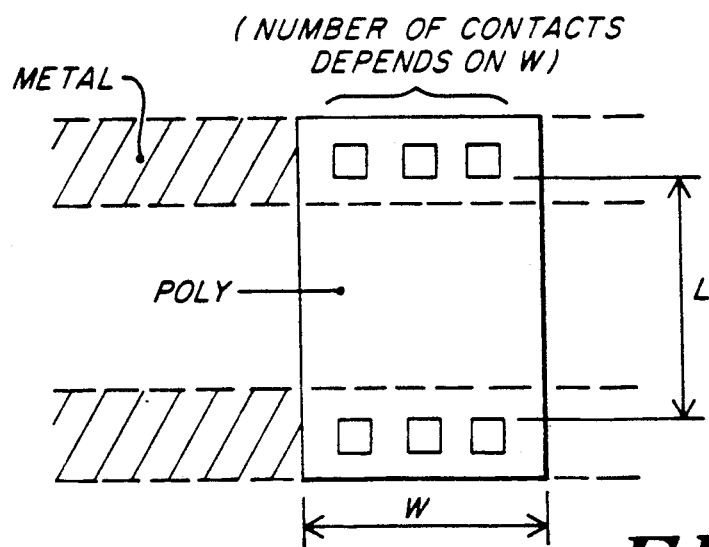
FIG. 15 is a representation of the general form of the primitives for resistors in a quadratic current divider.

FIG. 15 shows the general layout form of the primitives 150, which are polysilicon. Contact resistance is about 2 $\Omega$, and the contact size and spacing are $2 \times 2$ and 2 $\mu$m, respectively. The number of contacts 151 per row 152 is the maximum possible for the width. The primitive resistance $R_P$, including the metal-poly contacts, is about $$R_P \approx 20\left(\frac{L}{W}\right) + 4\left(\frac{1}{(W/4)}\right) \approx 20\left(\frac{L+1}{W}\right)\Omega,$$

where W and L are in microns. Table 4 gives W, L, and $R_P$ for each primitive. The estimated $R_P$ values (within 0.1 ohm) for $R_0$ through $R_5$, sum to 180 $\Omega$ (to within an ohm), so they can be compared to the ideal values without normalization of the total resistance.

Design issues relating to the resistive current divider include voltage range, resistor material, area, associated buffer errors, and associated transresistance amp errors.

The voltage developed on the lines, which is the load voltage $v_L$ at the output of each buffer, must not exceed 0.5 V for normal buffer operation. On a uniform line, suppose a total current i enters from all the buffers feeding the line. A theoretical upper bound on the worst-case situation occurs if i enters the node at the center of the line. The load voltage $v_L$ is less than $v_L < \frac{1}{4}R_{tot}i$ at all nodes. At $i = 400$ $\mu$A, $v_L < 0.45$ V; this allows a current density of 1.5 $\mu$A per cell.

TABLE 4

| primitive | L ($\mu$m) | W ($\mu$m) | estimated $R_P$ ($\Omega$) | ideal $R_P$ ($\Omega$) |
|---|---|---|---|---|
| $R_0$ | 5 | 27 | 4.4 | 5 |
| $R_1$ | 12 | 20 | 13.0 | 15 |
| $R_2$ | 17 | 15 | 24.0 | 25 |
| $R_3$ | 17 | 10 | 36.0 | 35 |
| $R_4$ | 17 | 8 | 45.0 | 45 |
| $R_5$ | 22 | 8 | 57.5 | 55 |
| 60 $\Omega$ | 24 | 8 | 62.5 | 60 |

Dimensions and estimated resistances of primitives, with ideal values for comparison.

Considering that this bound is conservative (with all the current into the center of the line), a revised estimate, based on a uniformly distributed current, is about 3 $\mu$A per cell. This estimate holds for a quadratic line as well.

Polysilicon is definitely the best choice for the resistors, because of its low resistivity and good tolerance properties, compared to other resistors. For both the uniform and quadratic lines, the major tradeoff is between area and random mismatches, as larger dimensions give better matching. There is also the global resistivity gradient across the chip, but this can't be improved without going to special fabrication techniques. The quadratic line, in contrast to the uniform line, has an accuracy problem due to errors in estimating the relative resistance values for different dimensions. Second-order effects such as shape differences and contact resistance uncertainties cause deviations from the simple L/W dependence. A design having a short, wide resistor for $R_L$ at one end and a single long, narrow one at the other end should be avoided. This is because it is likely to have a large bowing error, i.e. near the middle the error (in its current dividing task) is large. On the other hand, using just a single primitive (say the smallest resistance required), and building the larger ones out of several connected in series, would require excessive area, especially with this highly nonuniform line, in which the maximum resistance is 59 times the minimum. The design used here is a compromise between these two extremes.

The buffers cause errors that depend on $R_{tot}$. Their output conductances are effectively resistors to ground, appearing at every internal node along the line. This leakage, which is not uniformly proportional to the injected current at each location, gives an error that increases in proportion to $R_{tot}$. It can be argued that the leakage has a high common-mode component that tends to cancel in the system, especially for small or moderately sized objects near the center of the field. To take full advantage of this effect, the moments for orientation are mass-normalized according to which set of dividers is used to extract a certain quantity. But the cancellation is too complicated to analyze exactly, and here the total leakage current is given just to get a rough estimate of the magnitude. For a current i entering the center of a uniform line, the spatially averaged buffer load voltage $\bar{v}_L$ is $\bar{v}_L = \frac{1}{8}iR_{tot}$, and the resulting total leakage current $i_{lk}$ is $i_{lk} = Ng_0e,ovs/v/_L$, where $g_0$ is the buffer output conductance. Therefore, $i_{lk}/i = (N/8)g_0R_{tot}$, which at $g_0 \cong 0.2$ μS and $R_{tot} \cong 4.5$ kΩ is $i_{lk}/i \cong 0.35\%$. This value is approached only for objects near the middle of an edge, i.e. away from a corner. It is smaller when the grid perimeter current is evenly distributed, say for an object near the center of a field. Yet this error, being somewhat higher than other errors, is a candidate for improvement in a later design.

The reverse voltage gain of the buffers is another source of error that depends on $R_{tot}$. Generally this gain is under 0.005. The grid sees a spatially averaged voltage of $0.005\bar{v}_L$ or less; this is $0.0006R_{tot}i \cong (3\ \Omega) \times i$. Note that this "effective resistance" the grid sees is only 0.1% of $R_g$. (For comparison, the buffer input resistance $R_{in}$ gives an effective resistance $R_{in}/N \cong 100\ \Omega$, which is 3% of $R_g$.) Again, exact sensitivity calculations were not done, but this is a relatively minor error.

The (external) transresistance amplifiers cause error that increases as $R_{tot}$ is decreased. Drift in the input offset voltage appears as a current error. If four amps are used, which requires that the uniform and quadratic lines be connected at each corner, then each amp input node sees about 1 kΩ at the chip output. A 25 μV offset voltage drift in each amp, as might be caused by a 3° temperature change, will typically cause $\approx 100$ nA of equivalent output current error. (The bias current drift in the LM301A used here is small compared to this.) This is 0.1% of the typical total (net) output current of 100 μA. Note that decreasing $R_{tot}$ increases these errors. Low-drift op-amps could certainly be used, but other problems associated with low $R_{tot}$ values, e.g. external noise pickup, could appear. Drift errors in general, including those from the buffer offset current sources, can be reduced by doing cell toggling (with output sampling) often enough.

In summary, the primary design tradeoff is in the choice of $R_{tot}$. As $R_{tot}$ is decreased, the related buffer error is reduced, but the transresistance amp error is increased. The voltage range is also a constraint. To reduce certain systematic errors, the resistors in the quadratic lines are made using a set of primitives.

Other Design and Operating Considerations

Several issues directly related to the image sensing are array size, cell area and performance, effective image resolution, intensity conditioning function, scene brightness range, and image current.

There is a tradeoff between the size of the array (N×N) and the area available for each cell and grid resistor. By choosing the relatively small N of 29, an area of 190×190 μm² is available. The actual resolution is coarse, but by using the continuous, piecewise-linear conditioning function $f_{2a}(I)$, along with intentional image blurring over a few pixels, the effective resolution is several times higher.

The image current is the sum of all cell output currents and is analogous to the zeroth moment $M_o$. It has a large variation with the object area if the scene brightness is held constant. Maintaining a certain degree of accuracy depends, to first order, on measuring the chip output currents to a fixed degree of *relative* precision. The burden of handling a wide range of object sizes can be shared between two parts of the system: 1) the path from the scene to the cell output currents, and 2) the path from the cell currents to the system output, including whatever is used to measure the final output voltages. For example, suppose a 10-bit A-D is used at the output. This allows a 4:1 range in the imaging current with 8-bit accuracy (±0.2%) at best, because the outputs also depend on object location. Other considerations include the adjustability of the range in some A-D converters, and the output current discrepancy between the bottom-left and top-right quadratic line outputs ($i_6$ and $i_8$). Because of other errors such as drift and nonlinear effects, a very wide range in image current could degrade accuracy, and thus is undesirable even if more accurate A-D's are used. Quantization is an error source which can be estimated from simple sensitivity formulas. Here it was eliminated by using a digital multimeter (to measure the d.c. steady-state voltages). Nevertheless, in the experiments, the imaging current was always held between about 25 and 100 μA; few objects take more than 25% of the image field area. The remainder of the available object area range is handled by adjusting the scene lamp brightness, which is equivalent to adjusting the current per cell; the light threshold must be adjusted accordingly. (The gray-level distribution of the object is also important. If an object has a few bright areas, and is mostly dim but above threshold, performance could be degraded.) The cell area and accuracy are related to the required range of brightness and threshold adjustability; this is a major design tradeoff.

The intensity conditioning function is affected by cell errors such as phototransistor nonlinearities, etc. But an error in $f(I)$ that is *consistent* over all the cells won't cause system errors to first order, because this is essentially a smooth, consistent alteration of the image brightness. If the system is calibrated for a particular object, and a fixed set of operating parameters (e.g. scene brightness and offsetting currents), the position and orientation can be referenced to the physical object, and only mismatches in the cells will cause errors.

Another design and operating consideration is power. The chip dissipation is under 40 mW if the cells are operated in the nominal range. The buffers draw about 2 mA, and the cells would draw about 5 mA *if* all were to be on, as an upper bound on the worst-case; these currents are from the 5.5 V supply. There is also about 1 mA into the −0.7 V supply. Typically, however, the cells draw ≈2 mA, and the total dissipation is then about 25 mW. Under transient worst-case conditions, such as when an LED light pulse shines on the chip and when the maximum thresholding current is used, the peak power is under 80 mW.

In this design the power is far below what the chip can dissipate, but to keep temperature gradients low, this is necessary. Certainly the power can't be made too low without running transistors in subthreshold, which would result in more error. Though estimating the error due to temperature variations is complicated, two potentially sensitive system parts can be identified: 1) the resistors, and 2) the buffers, particularly the offsetting current sources. Except for the choice of material, nothing can be done about the resistors without resorting to advanced fabrication techniques. The buffer offsetting sources on the grid side together send about 500 µA of d.c. current through the main signal path—there is about 1 mA of current which can drift and perturb the output. To mitigate a potential problem with temperature drift, the offsetting sources are matched; i.e. the current sink at each buffer output is derived from a local transistor identical to the source at the input (see FIG. 13). This is done to cancel drifts that would otherwise be present if separate global biasing busses were used for the sourcing and sinking transistors. (The buffer gain K, which slightly exceeds unity, contributes to the net output current due to the offsetting. It is desirable to keep the net current robustly positive rather than make it as close to zero as possible; this is so the final output always remains the same sign, which is more convenient for an acquisition system.)

Another design and operating consideration is speed. The speed is limited primarily by the cells. But in the system operation, there are other considerations for optimal speed performance. In the LED technique, there is a brief, periodic light pulse which puts all the cells above the threshold long enough so that by the end of the pulse, $i_o$ is positive. After the pulse, the outputs settle to the steady-state values, and the chip output is sampled. (It is assumed that the image changes only during the light pulse, not when the cell outputs are settling.) In this design the uniform and quadratic lines must be sampled separately, because the buffer outputs are steered (which eliminates the error that would be introduced by a current copier circuit, which would be needed if multiplexing were not done). The external amps must be able to slew and settle rapidly enough when the line set is switched; this could have implications for the filtering time constant discussed above. The following timing scheme is recommended for operating the system at the estimated maximum of 4000 frames per second (which is 250 µs. per frame) in a sampled image mode. The LED pulse has a 50 µs. duration that induces a nominal cell photocurrent $i_p$ of 2 µA. The duty cycle is 20%, which allows a threshold current of up to 300 nA with a 50% margin for cell mismatches. After the pulse, a 150 µs. period is allotted for settling, after which the uniform line outputs are sampled, preferably simultaneously. The remaining 50 µs. is for switching over to the quadratic lines, letting the external amps settle, and sampling. Depending on the conversion time of the A-D's, sample-and-holds may be needed.

When using the scheme described above, the settling accuracy is directly related to the response of a cell to a falling brightness step. Measurements show that settling accuracy is in the order of 1% in 150 µs., and is dependent on the conditions, especially the final value. An apparent worst-case situation occurs if the brightness at a pixel is just *slightly below* the threshold, so that it eventually settles to zero; here the cell time constant is high during the final settling asymptote, and it has very little overdrive enhancement from the threshold current. (In contrast, if the brightness goes to zero, the threshold current acts as an overdrive that aids the settling of $i_o$ to zero.) Yet to a first-order approximation, this settling error can be thought of as a small component in the distortion of the conditioning $f(I)$ discussed earlier, which has virtually no effect if it is consistent for all the cells *and* if the outputs are sampled simultaneously. (This is assuming that other system components, such as the external amps and resistive grid, settle much faster than the cells.) Mismatches and other system settling errors might still have an effect, and very short settling periods (i.e. that give a 10% error) should not be used; otherwise $f(I)$, which tends to distort to higher values at a given I, could be altered so much that the threshold disappears.

When the cells are toggled off and the system offsets are sampled, the cells go into a state requiring a recovery time. The delay is strongly dependent on the conditions, but can be on the order of 100 µs. for an overdrive $i_p - i_{th} = 0.5$ µA. There are ways of reducing this delay time, such as turning off the threshold current, or putting a transistor in the cell that could provide a current pulse from the $V_{DD}$ supply. In system operation, it is important to take this effect into consideration.

What is claimed is:

1. A device for determining the position and angular orientation of an object in an image focused on said device, the position and angular orientation determined with respect to a first axis and a second axis of a plane, said position in the plane defined in terms of a first moment and said angular orientation with respect to the first and second axes defined in terms of first and second moments of the image, comprising:

a two-dimensional array of photoreceptor cells, each cell adapted to convert the intensity of light focused on said cell to an electrical signal, a resistive grid having a perimeter, the nodes of which are electrically connected to the outputs of said photoreceptor cells, current buffers adapted to impose a voltage distribution at the perimeter of the grid and to convey currents exiting around the perimeter of the grid, resistive current dividers into which currents from said current buffers are injected at spatial intervals, and amplifiers adapted to impose voltages at locations in the resistive current dividers, said locations selected such that currents exiting the resistive current dividers at these locations represent a data vector which is independent of grid size and which represents the position and orientation of the object.

2. A device for determining the position and angular orientation of an object in an image focused on said device, the position and angular orientation determined with respect to a first axis and a second axis of a plane, said position in the plane defined in terms of a first moment and said angular orientation with respect to the first and second axes defined in terms of first and second moments of the image, comprising:

a two-dimensional array of photoreceptor cells, each cell adapted to convert the intensity of light focused on said cell to an electrical signal, a resistive sheet having a perimeter, where positions on the resistive sheet are electrically connected to the outputs of said photoreceptor cells, current buffers adapted to impose a voltage distribution at tap-off points at the perimeter of the sheet and to convey currents exiting the sheet at said tap-off points, resistive current dividers into which currents from said current buffers are injected at spatial intervals, and amplifiers adapted to impose voltages at locations in the resistive current dividers, said locations selected such that currents exiting the resistive current dividers at these locations represent a data vector which is independent of the number of tap-off points and which represents the position and orientation of the object.

3. In devices which determine the position and angular orientation of an object within an image focused on said device, the position and angular orientation determined with respect to a first axis and a second axis of a plane, said position in the plane defined in terms of a first moment and said angular orientation with respect to the first and second axes defined in terms of first and second moments of the image, said image represented by electrical signals at the nodes of a two-dimensional resistive grid having a perimeter, the improvements comprising:

apparatus adapted to impose a voltage distribution at the perimeter of said grid, apparatus adapted to inject currents exiting the grid at the perimeter into current dividers, apparatus adapted to impose voltages at locations in said current dividers, and apparatus adapted to convey the currents exiting the current dividers at these locations, whereby a data vector of currents which is independent of grid size and which represents the position and angular orientation of the object in the image is obtained.

4. In devices which determine the position and angular orientation of an object within an image focused on said device, the position and angular orientation determined with respect to a first axis and a second axis of a plane, said position in the plane defined in terms of a first moment and said angular orientation with respect to the first and second axes defined in terms of first and second moments of the image, said image represented by electrical signals injected into a two-dimensional resistive sheet having a perimeter, the improvements comprising:

apparatus adapted to impose a voltage distribution at tap-off points at the perimeter of said sheet, apparatus adapted to inject currents exiting the sheet at said tap-off points into current dividers, apparatus adapted to impose voltages at locations in said current dividers, and apparatus adapted to convey the currents exiting the current dividers at these locations, whereby a data vector of currents which is independent of the number of tap-off points and which represents the position and orientation of the object in the image is obtained.

5. The device of claims 1, 2, 3, or 4 wherein said device is fabricated as a single analog VLSI microchip.

6. The device of claims 1, 2, 3, or 4 wherein orientation is defined as axis of least inertia.

7. The device of claims 1 or 2, wherein said photoreceptor cells convert the intensity of light to an electrical signal according to an intensity conditioning function for binary imaging.

8. The device of claims 1 or 2, wherein said photoreceptor cells convert the intensity of light to an electrical signal according to an intensity conditioning function for thresholded gray-level imaging.

9. The device of claims 1 or 3, wherein the voltage distribution imposed at the perimeter of the grid is a substantially constant voltage so that the perimeter of the grid is at a virtual ground.

10. The device of claims 2 or 4, wherein the voltage distribution imposed at the tap-off points is a substantially constant voltage so that the tap-off points are at a virtual ground.

11. The device of claims 1, 2, 3, or 4, wherein the voltages imposed at said locations in the current dividers are all substantially equal so that said locations are at a virtual ground.

12. The device of claims 1 or 2 wherein the amplifiers are transresistance amplifiers which provide the data vector as a set of voltages.

13. The device of claim 1, 2, 3, or 4 wherein said current dividers comprise uniform and nonuniform resistive lines.

14. The device of claim 13 wherein each said nonuniform line has a distribution of resistance such that the resulting cumulative resistance along the line is quadratic.

15. The device of claims 1 or 2, wherein said current buffers comprise switching means for switching the current between two or more current dividers.

16. The device of claims 1 or 2, wherein said current buffers comprise switching means for switching the currents between two or more current dividers, and the currents exiting the resistive current dividers at the amplifier locations are multiplexed to reduce the number of currents measured to obtain the data vector.

17. The device of claims 1 or 2, wherein said current buffers comprise current dividing means for dividing the current between two or more current dividers simultaneously.

18. The device of claims 1 or 2, wherein said current buffers comprise current copying means for providing the output current to two or more current dividers simultaneously.

19. The device of claims 1 or 3 wherein said grid is square with an equal number of nodes on each side, and wherein said current dividers comprise a uniform line and a non-uniform resistive line around the perimeter of the grid, the non-uniform line comprising four sections associated with the four sides of the grid, each section having a distribution of resistance such that the resulting cumulative resistance along the line is quadratic.

20. The device of claim 19 wherein a virtual ground is imposed in both the uniform and non-uniform lines at locations associated with the four corners of the grid, whereby the data vector is obtained from the eight currents exiting the current dividers at the virtual grounds.

21. The device of claim 19 wherein a virtual ground is imposed in both the uniform and non-uniform lines at locations associated with the four corners of the grid, whereby the data vector is obtained from six of the eight currents exiting the current dividers at the virtual grounds.

22. The device of claim 19 wherein said current buffers comprise switching means for switching the current exiting the grid between the uniform and the non-uniform current dividers, wherein a virtual ground is imposed in both the uniform and non-uniform lines at locations associated with the four corners of the grid, and wherein the two currents exiting the two current dividers at each corner of the grid are multiplexed, whereby the data vector is obtained from the resulting four currents exiting the current dividers at the virtual grounds.

* * * * *

UNITED STATES PATENT AND TRADEMARK OFFICE
CERTIFICATE OF CORRECTION

PATENT NO. : 5,220,398

DATED : June 15, 1993

INVENTOR(S) : Berthold K.P. Horn, et al.

It is certified that error appears in the above-indentified patent and that said Letters Patent is hereby corrected as shown below:

Column 7, lines 34 - 38: Please amend the equation as follows:

delete $$\sum_{(j,k) \in P} h(j,k) +$$

and insert therefor --

$$\sum_{(j,k) \in P} h(j,k) \, i_p(j,k) +$$

Signed and Sealed this

Fifth Day of April, 1994

*Attest:*

BRUCE LEHMAN

*Attesting Officer*  *Commissioner of Patents and Trademarks*